United States Patent
Hu et al.

(10) Patent No.: US 10,610,071 B2
(45) Date of Patent: Apr. 7, 2020

(54) UPRIGHT VACUUM CLEANER

(71) Applicant: JIANGSU MIDEA CLEANING APPLIANCES CO., LTD., Suzhou (CN)

(72) Inventors: Wei Hu, Suzhou (CN); Hui Zou, Suzhou (CN); Xiahu Xiao, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 316 days.

(21) Appl. No.: 15/637,721

(22) Filed: Jun. 29, 2017

(65) Prior Publication Data

US 2017/0296008 A1    Oct. 19, 2017

Related U.S. Application Data

(63) Continuation of application No. PCT/CN2016/075614, filed on Mar. 4, 2016.

(30) Foreign Application Priority Data

Dec. 10, 2015 (CN) .......................... 2015 1 0917466
Dec. 10, 2015 (CN) .......................... 2015 1 0917497
(Continued)

(51) Int. Cl.
*A47L 5/30*    (2006.01)
*A47L 9/16*    (2006.01)
(Continued)

(52) U.S. Cl.
CPC ................... *A47L 5/30* (2013.01); *A47L 5/00* (2013.01); *A47L 5/225* (2013.01); *A47L 5/28* (2013.01);
(Continued)

(58) Field of Classification Search
CPC . A47L 5/30; A47L 5/225; A47L 9/009; A47L 9/22; A47L 9/0411; A47L 9/165;
(Continued)

(56) References Cited

U.S. PATENT DOCUMENTS

2015/0089768 A1*  4/2015  Wang .................... A47L 5/225
                                                         15/347

FOREIGN PATENT DOCUMENTS

CN    1667197 A    9/2005
CN    2845692 Y    12/2006
(Continued)

OTHER PUBLICATIONS

Jiangsu Midea Cleaning Electrical Appliance Co. Ltd., First Office Action, CN201510917466.2, dated Jun. 28, 2017, 10 pgs.
(Continued)

*Primary Examiner* — David Redding
(74) *Attorney, Agent, or Firm* — Morgan, Lewis & Bockius LLP

(57) ABSTRACT

An upright vacuum cleaner (1) includes: a brushroll assembly (100) including a brushroll casing (12) and a brushroll (11), the brushroll casing (12) defining a brushroll air-suction channel (122) therein; a motor assembly (200) including a motor housing (21) and a motor (22), the motor housing (21) having an air exhaust hole (213), a dirty air outlet (211) and a clean air inlet (212) and defining a motor air-suction channel (216) and a motor air-exhaust channel; and a body assembly (300) including a body (31) and a dirt cup (37) mounted to the body (31), the dirt cup (37) having a separating chamber (371) communicating with the dirty air outlet (211) and the clean air inlet (212) respectively.

19 Claims, 5 Drawing Sheets

(30) Foreign Application Priority Data

| Dec. 10, 2015 | (CN) | 2015 1 0917498 |
|---|---|---|
| Dec. 10, 2015 | (CN) | 2015 1 0917499 |
| Dec. 10, 2015 | (CN) | 2015 1 0917528 |
| Dec. 10, 2015 | (CN) | 2015 1 0917653 |
| Dec. 10, 2015 | (CN) | 2015 1 0918541 |
| Dec. 10, 2015 | (CN) | 2015 1 0918544 |
| Dec. 10, 2015 | (CN) | 2015 1 0918580 |
| Dec. 10, 2015 | (CN) | 2015 1 0918662 |
| Dec. 10, 2015 | (CN) | 2015 2 102756 U |
| Dec. 10, 2015 | (CN) | 2015 2 1027158 U |
| Dec. 10, 2015 | (CN) | 2015 2 1027550 U |
| Dec. 10, 2015 | (CN) | 2015 2 1028726 U |
| Dec. 10, 2015 | (CN) | 2015 2 1028730 U |
| Dec. 10, 2015 | (CN) | 2015 2 1028739 U |
| Dec. 10, 2015 | (CN) | 2015 2 1028779 U |
| Dec. 10, 2015 | (CN) | 2015 2 1028784 U |
| Dec. 10, 2015 | (CN) | 2015 2 1028812 U |
| Dec. 10, 2015 | (CN) | 2015 2 1028814 U |
| Dec. 10, 2015 | (CN) | 2015 2 1028913 U |
| Dec. 10, 2015 | (CN) | 2015 2 1029002 U |
| Dec. 10, 2015 | (CN) | 2015 2 1029087 U |
| Dec. 10, 2015 | (CN) | 2015 2 1029798 |
| Dec. 10, 2015 | (CN) | 2015 2 1030034 U |
| Mar. 1, 2016 | (CN) | 2016 1 0114861 |
| Mar. 1, 2016 | (CN) | 2016 2 0155481 U |

(51) Int. Cl.

| A47L 5/28 | (2006.01) |
|---|---|
| A47L 5/00 | (2006.01) |
| A47L 9/02 | (2006.01) |
| A47L 9/00 | (2006.01) |
| A47L 9/04 | (2006.01) |
| A47L 9/22 | (2006.01) |
| A47L 5/22 | (2006.01) |

(52) U.S. Cl.
CPC ............... *A47L 9/00* (2013.01); *A47L 9/009* (2013.01); *A47L 9/02* (2013.01); *A47L 9/0411* (2013.01); *A47L 9/0444* (2013.01); *A47L 9/165* (2013.01); *A47L 9/1666* (2013.01); *A47L 9/1683* (2013.01); *A47L 9/22* (2013.01)

(58) Field of Classification Search
CPC ........ A47L 9/1666; A47L 9/0444; A47L 5/00; A47L 9/00; A47L 9/02; A47L 5/28; A47L 9/1683
See application file for complete search history.

(56) References Cited

FOREIGN PATENT DOCUMENTS

| CN | 101201123 A | 6/2008 |
|---|---|---|
| CN | 202235160 U | 5/2012 |
| CN | 204520516 U | 8/2015 |
| CN | 105011857 A | 11/2015 |
| CN | 205251414 U | 5/2016 |
| CN | 205251415 U | 5/2016 |
| CN | 205251416 U | 5/2016 |
| CN | 205251418 U | 5/2016 |
| CN | 205338839 U | 6/2016 |
| CN | 205338840 U | 6/2016 |
| CN | 205625812 U | 10/2016 |
| EP | 1736088 A2 | 12/2006 |

OTHER PUBLICATIONS

Jiangsu Midea Cleaning Electrical Appliance Co. Ltd., First Office Action, CN201510917497.8, dated Jun. 7, 2017, 10 pgs.
Jiangsu Midea Cleaning Electrical Appliance Co. Ltd., First Office Action, CN201510917498.2, dated Jun. 16, 2017, 10 pgs.
Jiangsu Midea Cleaning Electrical Appliance Co. Ltd., First Office Action, CN201510917499.7, dated May 26, 2017, 6 pgs.
Jiangsu Midea Cleaning Electrical Appliance Co. Ltd., First Office Action, CN201510917528.X, dated Jun. 1, 2017, 15 pgs.
Jiangsu Midea Cleaning Electrical Appliance Co. Ltd., First Office Action, CN201510917653.0, dated Jun. 5, 2017, 14 pgs.
Jiangsu Midea Cleaning Electrical Appliance Co. Ltd., First Office Action, CN201510918541.7, dated Jun. 2, 2017, 10 pgs.
Jiangsu Midea Cleaning Electrical Appliance Co. Ltd., First Office Action, CN201510918544.0, dated Jun. 28, 2017, 10 pgs.
Jiangsu Midea Cleaning Electrical Appliance Co. Ltd., First Office Action, CN201510918580.7, dated Jun. 1, 2017, 10 pgs.
Jiangsu Midea Cleaning Electrical Appliance Co. Ltd., First Office Action, CN201510918662.1, dated Jun. 1, 2017, 9 pgs.
Jiangsu Midea Cleaning Electrical Appliance Co. Ltd., First Office Action, CN201610114861.1, dated Aug. 1, 2017, 10 pgs.
Midea, International Search Report and Written Opinion, PCT/CN2016/075614, dated Sep. 1, 2016, 16 pgs.

\* cited by examiner

UPRIGHT VACUUM CLEANER

PRIORITY CLAIM AND RELATED APPLICATIONS

This application is a continuation application of PCT Patent Application No. PCT/CN2016/075614, entitled "UPRIGHT VACUUM CLEANER" filed on Mar. 4, 2016, which claims priority to Chinese Patent Application No. 201510917499.7, entitled "UPRIGHT VACUUM CLEANER" filed on Dec. 10, 2015, Chinese Patent Application No. 201521029002.X, entitled "UPRIGHT VACUUM CLEANER", filed on Dec. 10, 2015, Chinese Patent Application No. 201510917466.2, entitled "UPRIGHT VACUUM CLEANER", filed on Dec. 10, 2015, Chinese Patent Application No. 201521028726.2, entitled "UPRIGHT VACUUM CLEANER", filed on Dec. 10, 2015, Chinese Patent Application No. 201510917497.8, entitled "UPRIGHT VACUUM CLEANER", filed on Dec. 10, 2015, Chinese Patent Application No. 201521028730.9, entitled "UPRIGHT VACUUM CLEANER", filed on Dec. 10, 2015, Chinese Patent Application No. 201521029087.1, entitled "UPRIGHT VACUUM CLEANER", filed on Dec. 10, 2015, Chinese Patent Application No. 201510918662.1, entitled "UPRIGHT VACUUM CLEANER", filed on Dec. 10, 2015, Chinese Patent Application No. 201.521028812.3, entitled "UPRIGHT VACUUM CLEANER", filed on Dec. 10, 2015, Chinese Patent Application No. 201510918544.0, entitled "UPRIGHT VACUUM CLEANER", filed on Dec. 10, 2015 Chinese Patent Application No, 201521028739.X, entitled "UPRIGHT VACUUM CLEANER", filed on Dec. 10, 2015, Chinese Patent Application No. 20151091.8580.7, entitled "UPRIGHT VACUUM CLEANER", filed on Dec. 10, 2015, Chinese Patent Application No. 201521027156.5, entitled "UPRIGHT VACUUM CLEANER", filed on Dec. 10, 2015, Chinese Patent Application No. 201510917498.2, entitled "UPRIGHT VACUUM CLEANER", filed on Dec. 10, 2015, Chinese Patent Application No. 201521027158.4, entitled "UPRIGHT VACUUM CLEANER", filed on Dec. 10, 2015, Chinese Patent Application No. 20152.1028814.2 entitled "UPRIGHT VACUUM CLEANER", filed on Dec. 10, 2015, Chinese Patent Application No. 201521028779.4, entitled "UPRIGHT VACUUM CLEANER", filed on Dec. 10, 2015, Chinese Patent Application No. 201521029798.9, entitled "UPRIGHT VACUUM CLEANER", filed on Dec. 10, 2015, Chinese Patent Application No. 201510918541.7, entitled "UPRIGHT VACUUM CLEANER", filed on Dec. 10, 2015, Chinese Patent Application No, 201521027550.9, entitled "UPRIGHT VACUUM CLEANER", filed on Dec. 10, 2015, Chinese Patent Application No. 201510917653.0, entitled "UPRIGHT VACUUM CLEANER", filed on Dec. 10, 2015, Chinese Patent Application No. 201521028784.5, entitled "UPRIGHT VACUUM CLEANER", filed on Dec. 10, 2015, Chinese Patent Application No. 201510917528.X, entitled "UPRIGHT VACUUM CLEANER", filed on Dec. 10, 2015, Chinese Patent Application No. 201521028913.0, entitled "UPRIGHT VACUUM CLEANER", filed on Dec. 10, 2015, Chinese Patent Application No. 201521030034.1, entitled "UPRIGHT VACUUM CLEANER", filed on Dec. 10, 2015, Chinese Patent Application No. 201610114861.1, entitled "UPRIGHT VACUUM CLEANER", filed on Mar. 1, 2016, and Chinese Patent Application No. 201620155481.8, entitled "UPRIGHT VACUUM CLEANER", filed on Mar. 1, 2016, all of which are incorporated by reference in their entirety.

TECHNICAL FIELD

The present disclosure relates to a field of cleaning machines, and more particularly to an upright vacuum cleaner.

BACKGROUND

A vacuum cleaner in the related art includes two motors to drive a brushroll and a fan respectively, and the motor for driving the fan is usually arranged horizontally. That is, a motor shaft of the motor is parallel to a mounting platform for the motor, such that a motor housing for the motor has a huge volume and the motor occupies a large area. Moreover, the motor arranged horizontally limits the arrangement of other parts of the vacuum cleaner to a great extent.

SUMMARY

The present disclosure aims to solve at least one of the technical problems existing in the prior art. Thus, the present disclosure provides an upright vacuum cleaner having a simple and compact structure and a small volume, thus facilitating a structure arrangement. Further, the upright vacuum cleaner is low in cost and artistic in appearance.

According to the embodiments of the present disclosure, the upright vacuum cleaner includes: a brushroll assembly including a brushroll casing and a brushroll disposed in the brushroll casing, the brushroll casing having a dust suction port and defining a brushroll air-suction channel communicating with the dust suction port; a motor assembly including a motor housing and a motor disposed in the motor housing, the motor housing having an air exhaust hole, a dirty air outlet and a clean air inlet, and defining a motor air-suction channel and a motor air-exhaust channel, the motor air-suction channel being communicated between the brushroll air-suction channel and the dirty air outlet, and the motor air-exhaust channel being communicated between the clean air inlet and the air exhaust hole; and a body assembly including a body and a dirt cup mounted to the body, the dirt cup having a separating chamber communicating with the dirty air outlet and the clean air inlet respectively.

In the upright vacuum cleaner according to the embodiments of the present disclosure, the motor air-suction channel and the motor air-exhaust channel are formed in the motor housing to facilitate the transmission of dirty air and clean air, which utilizes the space in the motor housing effectively to improve the space utilization rate, and also reduces the number of pipes to save the cost and improve the efficiency of assembling or disassembling the upright vacuum cleaner. Thus, the upright vacuum cleaner has a compact structure and an aesthetic appearance. Additionally, the motor of the upright vacuum cleaner is arranged vertically to reduce an occupation space of the upright vacuum cleaner and further to facilitate diverse arrangements of various parts of the upright vacuum cleaner.

According to an example of the present disclosure, the dirty air outlet is connected to the dirt cup by an air-inlet pipe assembly so as to be communicating with the separating chamber.

According to an example of the present disclosure, the air-inlet pipe assembly includes: an air-inlet pipe provided to the motor housing and having a first end connected to the dirty air outlet; and a first hose connected between a second end of the air-inlet pipe and an air inlet of the dirt cup.

According to an example of the present disclosure, the first hose is detachably connected between the second end of the air-inlet pipe and the air inlet of the dirt cup.

According to an example of the present disclosure, the body defines a body air-exhaust channel having a first end connected to an air outlet of the dirt cup and communicating with the separating chamber, and a second end communicating with the clean air inlet.

According to an example of the present disclosure, the second end of the body air-exhaust channel is communicating with the clean air inlet by an air exhaust pipe.

According to an example of the present disclosure, the motor drives the brushroll to roll via the drive belt, and the brushroll air-suction channel includes a first air-suction channel and a second air-suction channel disposed at two sides of the drive belt.

According to an example of the present disclosure, the first air-suction channel and the second air-suction channel are arranged symmetrically with respect to the drive belt.

According to an example of the present disclosure, the motor air-suction channel includes a first branch channel communicated to the first air-suction channel and a second branch channel communicated to the second air-suction channel, and the first branch channel and the second branch channel are converged and then communicating with the dirty air outlet.

According to an example of the present disclosure, the first branch channel and the second branch channel are defined by a motor casing of the motor and the motor housing, and the first branch channel and the second branch channel together form a stereoscopic space with a substantially annular cross section.

According to an example of the present disclosure, the dirty air outlet and the clean air inlet are arranged axially symmetrically with respect to a central line of the motor housing.

According to an example of the present disclosure, the upright vacuum cleaner further includes a directional control valve having a first air hole, a second air hole and a third air hole, in which the first air hole is communicating with the brushroll air-suction channel, the second air hole is communicating with the air inlet of the dirt cup, the third air hole is communicating with the air outside, and the directional control valve is configured to switch between a first state in which the first air hole and the second air hole are communicated and a second state in which the second air hole and the third air hole are communicated.

According to an example of the present disclosure, the directional control valve includes: a three-way pipe including a first pipe section, a second pipe section and a third pipe section communicating with one another, the first air hole being defined by a free end of the first pipe section and the second air hole being defined by a free end of the second pipe section; and a two-way pipe including a fourth pipe section and a fifth pipe section communicating with each other, the third air hole being defined by a free end of the fourth pipe section and the fifth pipe section defining a fourth air hole, in which at least a part of the fifth pipe section is inserted into the third pipe section and is movable between a first position in which the first air hole is communicating with the second air hole and a second position in which the fourth air hole is communicating with the second air hole.

According to an example of the present disclosure, a first end of the fifth pipe section is connected to the fourth pipe section and a second end of the fifth pipe section has a closed end wall, and the fourth air hole is formed in a side wall of the second end of the fifth pipe section.

According to an example of the present disclosure, an end of the fourth pipe section connected to the fifth pipe section abuts against a free end of the third pipe section when the two-way pipe moves to the second position.

According to an example of the present disclosure, the upright vacuum cleaner further includes a second hose having a first end communicating with the outside air and a second end connected to the third air hole.

According to an example of the present disclosure, the dirt cup includes an air inlet and an air outlet. The body assembly further includes; a filter provided in the dirt cup and having a filter inlet and a filter outlet, the filter outlet being communicated between the filter inlet and the air outlet; and a cyclonic cone assembly having a cyclone and a cyclonic guide, in which a first end of the cyclone is communicating with the air inlet, and the cyclonic guide is fitted in a second end of the cyclone and is detachably fitted over the filter to spirally guide dirty air introduced into the cyclone through the air inlet to the filter inlet.

According to an example of the present disclosure, the cyclonic guide has a first cylindrical surface, the filter has a second cylindrical surface, and the cyclonic guide is detachably fitted over the filter by the first cylindrical surface and the second cylindrical surface.

According to an example of the present disclosure, the filter is configured as a cylinder with an open end and a closed end, the open end of the filter defines the fitter outlet and the filter inlet is formed in a side wall of the filter.

According to an example of the present disclosure, the filter includes a first section and a second section, the first section is configured to be a solid cylinder while the second section is configured to be a hollow cylinder, a first end of the second section is connected to a first end of the first section, a second end of the second section is open to define the filter outlet, and the filter inlet is formed in a side wall of the second section.

According to an example of the present disclosure, the filter inlet includes a plurality of filter pores evenly distributed in an axial direction and/or in a circumferential direction of the second section and spaced apart from one another.

According to an example of the present disclosure, the cyclonic guide includes: a sleeve, a part of the sleeve being fitted over the first section; and a guide plate provided between the sleeve and the cyclone to define a spiral channel along with the sleeve and the cyclone, the spiral channel allowing the dirty air to spirally flow from the air inlet to the fitter inlet.

According to an example of the present disclosure, the sleeve and the guide plate are molded integrally.

According to an example of the present disclosure, the cyclone and the cyclonic guide are fixedly connected.

According to an example of the present disclosure, the cyclone and the cyclonic guide are connected in a threaded-joint manner or in a hot-melt-joint manner via ultrasonic waves.

Additional aspects and advantages of embodiments of present disclosure will be given in part in the following descriptions, become apparent in part from the following descriptions, or be learned from the practice of the present disclosure.

REFERENCE NUMERALS

Figure 1:
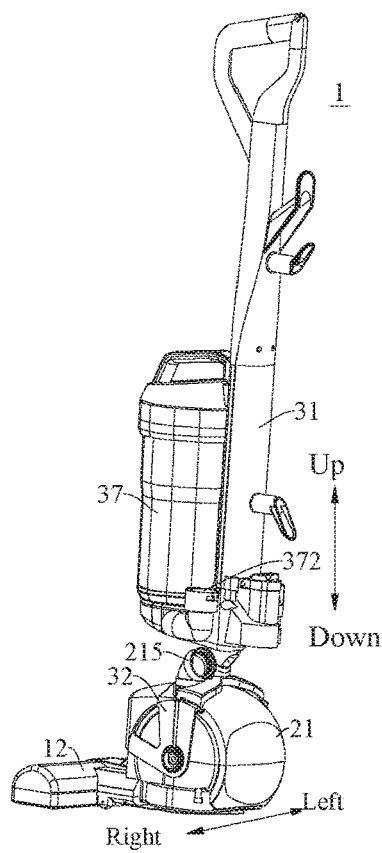
FIG. 1 is a schematic view of an upright vacuum cleaner according to an embodiment of the present disclosure.

1: upright vacuum cleaner;
100: brushroll assembly; 11: brushroll; 111: first brushroll section; 1111: first body; 1112: first bristle; 112: second brushroll section; 1121; second body; 1122: second bristle; 113: connecting shaft section; 12: brushroll casing; 122: brushroll air-suction channel; 1221: first air-suction channel; 1222: second air-suction channel; 123: drive-belt mounting chamber; 124; upper casing; 125: lower casing; 13: drive belt; 14: tensioning wheel;
200: motor assembly; 21: motor housing; 211: dirty air outlet; 212: clean air inlet; 213: air exhaust hole; 214: dirty air output pipe; 215: clean air input pipe; 216: motor air-suction channel; 2.161: first branch channel; 2162: second branch channel; 22; motor; 221: motor shaft; 222: motor casing;
300: body assembly; 31: body; 311: body air-exhaust channel; 32: bridging member; 321: top plate; 322: side plate; 37: dirt cup; 3701: dirt-cup body; 3701: dirt-cup upper cover; 3702: dirt-cup lower cover; 371: separating chamber; 372: air inlet; 373: air outlet; 38: wheel; 39: air exhaust pipe;
51: air-inlet pipe; 52: first hose;
600: directional control valve; 61: three-way pipe; 611: first pipe section; 612: second pipe section; 613: third pipe section; 62: two-way pipe; 621: fourth pipe section; 622: fifth pipe section; 631: first air hole; 632: second air hole; 633: third air hole; 634: fourth air hole;
900: cyclonic separating device; 92: filter; 92a: filter inlet; 922a: filtration pore; 92b: filter outlet; 920: second cylindrical surface; 921: first section; 922: second section; 93: cyclonic cone assembly; 930: first cylindrical surface; 930a: spiral channel; 931: cyclone; 932: cyclonic guide; 9321: sleeve; 9322: guide plate; 94: filter cotton assembly.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

The following description provides many different embodiments or examples to realize different structures of the present disclosure. To simplify the description of the present disclosure, components and configurations in specific examples are elaborated. Of course, they are explanatory, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

An upright vacuum cleaner 1 according to the embodiments of the present disclosure will be described with reference to FIGS. 1 to 20.

As shown in FIG. 1 to FIG. 17, the upright vacuum cleaner 1 according to the embodiments of the present disclosure includes a brushroll assembly 100, a motor assembly 200 and a body assembly 300. Specifically, the brushroll assembly 100 includes a brushroll casing 12 and a brushroll 11 disposed in the brushroll casing 12. The brushroll casing 12 has a dust suction port and defines a brushroll air-suction channel 122 communicating with the dust suction port. In other words, the upright vacuum cleaner 1 mainly includes the brushroll assembly 100, the motor assembly 200 and the body assembly 300. The brushroll assembly 100 mainly includes the brushroll casing 12 and the brushroll 11. The brushroll casing 12 defines the brushroll air-suction channel 122 therein and has the dust suction port communicating with the brushroll air-suction channel 122. The brushroll 11 is rotatably arranged in the brushroll casing 12.

Referring to FIG. 1, the brushroll 11 extends along a horizontal direction (i.e. a left-and-right direction shown in FIG. 1), and a drive belt 13 is provided between the motor assembly 200 and the brushroll 11 and connected to the motor 22 and the brushroll 11 respectively. When a motor shaft 221 of the motor 22 rotates, the motor shaft 221 drives the drive belt 13 to rotate due to a frictional resistance between the motor shaft 221 and a surface of the drive belt 13. Similarly, the drive belt 13 drives the brushroll 11 to rotate around its own axis due to a frictional resistance between the brushroll 11 and the surface of the drive belt 13. Thus, the brushroll 11 may be driven to rotate by the motor 22, so as to realize a purpose of cleaning the floor.

The motor assembly 200 includes a motor housing 21 and a motor 22 provided in the motor housing 21. The motor housing 21 has an air exhaust hole 213, a dirty air outlet 211 and a clean air inlet 212, and defines a motor air-suction channel 216 and a motor air-exhaust channel therein. The motor air-suction channel 216 communicates the brushroll air-suction channel 122 with the dirty air outlet 211, and the motor air-exhaust channel communicates the clean air inlet 212 with the air exhaust hole 213.

Figure 2:
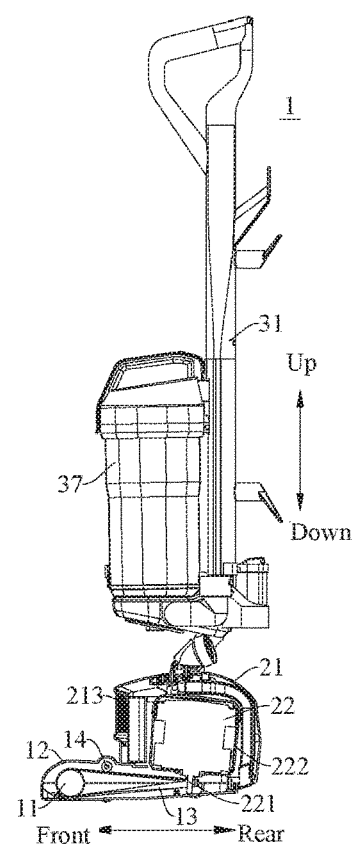
FIG. 2 is a side view of the upright vacuum cleaner illustrated in FIG. 1, in which a motor is located at a first oblique position.
Figure 3:
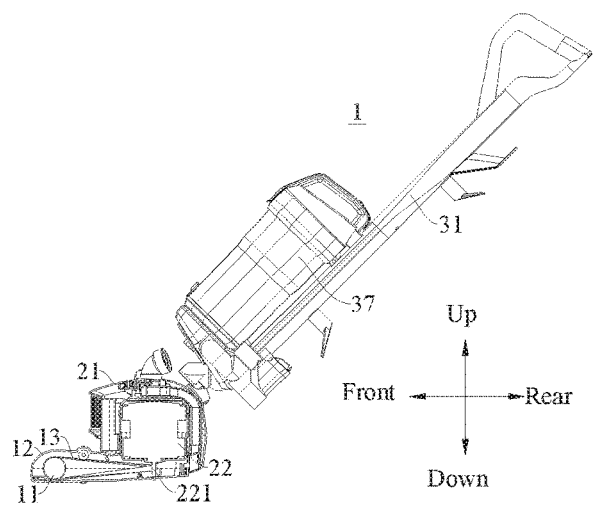
FIG. 3 is a side view of the upright vacuum cleaner illustrated in FIG. 1, in which the motor is located at a first upright position.
Figure 4:
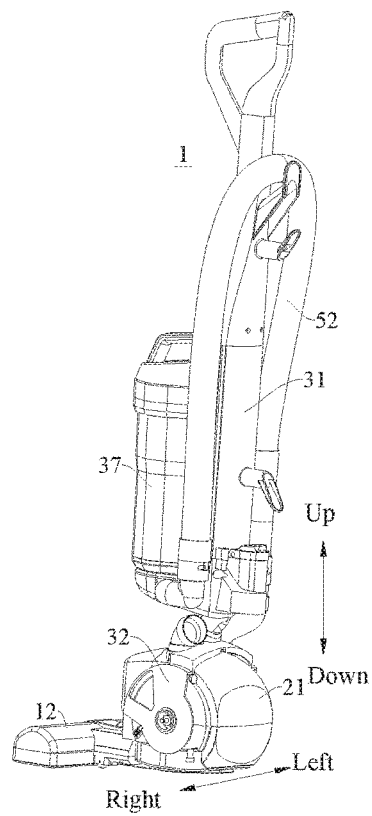
FIG. 4 is a schematic view of the upright vacuum cleaner illustrated in FIG. 1 in a direction.

Referring to FIG. 2 and FIG. 3, the motor assembly 200 mainly includes the motor housing 21 and the motor 22. The motor housing 21 defines the motor air-suction channel 216 and the motor air-exhaust channel spaced apart from each other. The motor housing 21 has the dirty air outlet 211 communicating with the motor air-suction channel 216 and the brushroll air-suction channel 122 respectively, and also has the clean air inlet 212 and the air exhaust hole 213 communicating with the motor air-exhaust channel respectively.

Specifically, the dirty air and the dust are introduced into the brushroll air-suction channel 122 via the dust suction port of the brushroll casing 12, then flow into the motor air-suction channel 216 in the motor housing 21, and discharged into the body assembly 300 via the dirty air outlet 211 in the motor housing 21. The clean air obtained after being processed by the body assembly 300 enters the motor air-exhaust channel in the motor housing 21 via the clean air inlet 212 of the motor housing 21 and then is discharged to the outside through the air exhaust hole 213 in the motor housing 21.

Further, the body assembly 300 includes a body 31 and a dirt cup 37 mounted to the body 31 and the dirt cup 37 has a separating chamber 371 communicating with the dirty air outlet 211 and the clean air inlet 212 respectively. That is, the body assembly 300 mainly includes the body 31 and the dirt cup 37, and the dirt cup 37 is detachably mounted to the body 31 and defines the separating chamber 371 therein. The separating chamber 371 is communicating with the dirty air outlet 211 and the clean air inlet 212 in the motor housing 21 respectively. Specifically, the dirty air and the dust are introduced into the brushroll air-suction channel 122 via the dust suction port of the brushroll casing 12, then flow into the motor air-suction channel 216 in the motor housing 21, and further discharged into the separating chamber 371 of the dirt cup 37 via the dirty air outlet 211 in the motor housing 21. The clean air obtained after being filtered and processed by the dirt cup 37 enters the motor air-exhaust channel in the motor housing 21 via the clean air inlet 212 of the motor housing 21 and is finally discharged to the outside via the air exhaust hole 213 in the motor housing 21.

Therefore, in the upright vacuum cleaner 1 according to the embodiments of the present disclosure, the motor air-suction channel 216 and the motor air-exhaust channel are provided in the motor housing 21 to facilitate transmissions of the dirty air and the clean air, such that a space in the motor housing 21 is utilized effectively to improve the space utilization rate, and also the number of pipes is reduced to save a cost and improve an efficiency of assembling or disassembling the upright vacuum cleaner 1, Furthermore, the upright vacuum cleaner 1 has a compact structure and thus an aesthetic appearance. Additionally, the motor of the upright vacuum cleaner 1 is arranged vertically to reduce an occupation space of the upright vacuum cleaner 1, thereby facilitating diverse arrangements of various parts of the upright vacuum cleaner 1.

Figure 6:
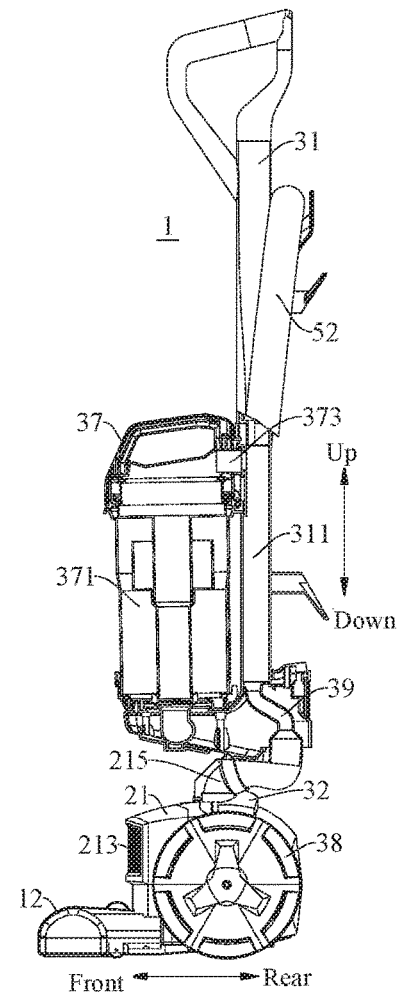
FIG. 6 is a side view of the upright vacuum cleaner illustrated in FIG. 5.

According to an embodiment of the present disclosure, the dirty air outlet 211 is connected to the dirt cup 37 by an air-inlet pipe assembly so as to be communicating with the separating chamber 371. Specifically, as shown in FIG. 6, two ends of the air-inlet pipe assembly are communicating with the separating chamber 371 of the dirt cup 37 and the dirty air outlet 211 in the motor housing 21 respectively, such that the dirty air and the dust are sucked into the brushroll air-suction channel 122 via the dust suction port of the brushroll casing 12, then flow into the motor air-suction channel 216 in the motor housing 21, and further discharged from the dirty air outlet 211 in the motor housing 21. The dirty air and the dust discharged from the dirty air outlet 211 in the motor housing 21 is then discharged into the separating chamber 371 of the dirt cup 37 for filtration through the air-inlet pipe assembly. The obtained clean air enters the motor air-exhaust channel in the motor housing 21 sequentially through the air-inlet pipe assembly and the clean air inlet 212 of the motor housing 21, and finally is discharged to the outside through the air exhaust hole 213 of the motor housing 21. Thus, the air-inlet pipe assembly disposed between the dirt cup 37 and the dirty air outlet 211 may serve to transmit the dirty air and the dust to guarantee the communication of airflow channels, and also prolong a separation time of the dust to improve a dust-suction effect of the upright vacuum cleaner 1.

Alternatively, according to an embodiment of the present disclosure, the air-inlet pipe assembly includes an air-inlet pipe 51 and a first hose 52. Specifically, the air-inlet pipe 51 is provided on the motor housing 21 and has a first end connected to the dirty air outlet 211, and the first hose 52 is connected between a second end of the air-inlet pipe 51 and an air inlet 372 of the dirt cup 37.

Figure 5:
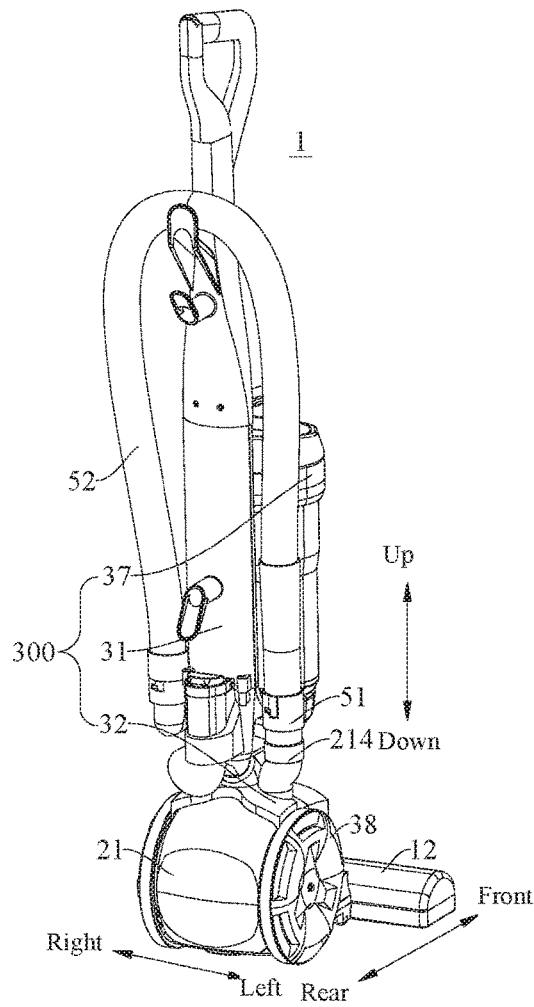
FIG. 5 is a schematic view of an upright vacuum cleaner according to another embodiment of the present disclosure.

Referring to FIG. 5, the air-inlet pipe assembly mainly includes the air-inlet pipe 51 and the first hose 52. The air-inlet pipe 51 is fixed on the motor housing 21. The first end of the air-inlet pipe 51 is communicating with the dirty air outlet 211 in the motor housing 21 and the second end of the air-inlet pipe 51 is communicating with a first end of the first hose 52; a second end of the first hose 52 is communicating with the separating chamber 371 of the dirt cup 37. Advantageously, a length of the first hose 52 may be greater than that of the body 31 to prolong a separation time and a filtration time of the dust and the dirty air and to increase a dust suction capacity, thus improving a working efficiency of the upright vacuum cleaner 1. Further, a middle part of the first hose 52 may be hanged to the body 31 to provide a compact structure. Alternatively, the first hose 52 may be a plastic first hose 52 or a rubber first hose 52, so as to facilitate coiling up the first hose 52, thus saving space and improving the space utilization rate.

In some other specific embodiments of the present disclosure, the first hose 52 is detachably connected between the second end of the air-inlet pipe 51 and the air inlet 372 of the dirt cup 37. That is, the first end of the first hose 52 may be detached from the second end of the air-inlet pipe 51 according to practical requirements. In other words, the upright vacuum cleaner 1 may suck dust directly through the first hose 52 without using the brushroll 11. Thus, the upright vacuum cleaner 1 has a simple and compact structure and is easy to assemble or disassemble. It is possible for the user to choose an appropriate vacuuming mode according to practical working conditions, thus providing good user experience and a high working efficiency with easy operations.

According to an embodiment of the present disclosure, the body 31 defines a body air-exhaust channel 311 therein. A first end of the body air-exhaust channel 311 is connected to an air outlet 373 of the dirt cup 37 and communicating with the separating chamber 371, and a second end of the body air-exhaust channel 311 is communicating with the clean air inlet 212.

Referring to FIG. 6, the dirt cup 37 has the air outlet 373 communicating with the separating chamber 371, and the body 31 defines the body air-exhaust channel 311 extending along a length direction of the body 31. An upper end of the body air-exhaust channel 311 is communicating with the air outlet 373 of the dirt cup 37 and a lower end of the body air-exhaust channel 311 is communicating with the motor air-exhaust channel in the motor housing 21. The clean air obtained after being filtered and processed by the dirt cup 37 is discharged from the air outlet 373 of the dirt cup 37, transmitted to the motor air-exhaust channel in the motor housing 21 after sequentially passing through the body air-exhaust channel 311 and the clean air inlet 212 of the motor housing 21, and finally discharged to the outside from the air exhaust hole 213 of the motor housing 21.

Accordingly, by providing the body air-exhaust channel 311 respectively communicating with the air outlet 373 of the dirt cup 37 and the clean air inlet 212 in the body 31, it is possible to omit the arrangement of redundant pipes, such that the number of parts of the upright vacuum cleaner 1 may be reduced to save cost and improve the efficiency of assembling or disassembling the upright vacuum cleaner 1, and also the upright vacuum cleaner 1 has a simple and compact structure. Furthermore, the upright vacuum cleaner 1 is protected from being affected by external pipes, so as to provide an aesthetic appearance.

Further, the second end (i.e. a lower end shown in FIG. 6) of the body air-exhaust channel 311 is communicating with the clean air inlet 212 through an air exhaust pipe 39. Specifically, the motor 22 is disposed below the body 31, and the air exhaust pipe 39 is disposed between the body 31 and the motor housing 21. Two ends of the air exhaust pipe 39 are communicating with the body air-exhaust channel 311 of the body 31 and the clean air inlet 212 of the motor housing 21 respectively. The clean air obtained after filtration of the dirt cup 37 is introduced into the motor air-exhaust channel in the motor housing 21 after sequentially passing through the body air-exhaust channel 311, the air exhaust pipe 39 and the clean air inlet 212, and finally discharged to the outside from the air exhaust hole 213 of the motor housing 21. Alternatively, the air exhaust pipe 39 may be configured as a straight pipe or a curved pipe extending from an outlet of the body air-exhaust channel 311 to the clean air inlet 212.

Figure 11:
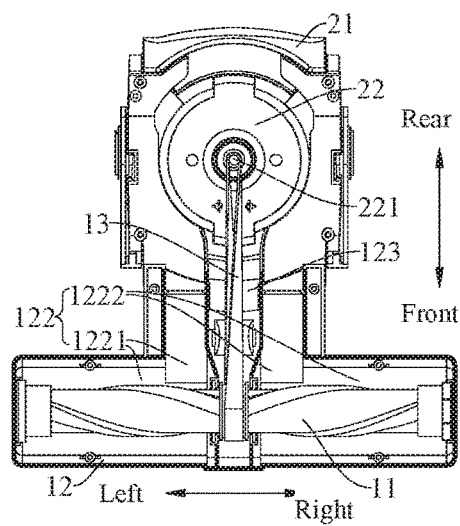
FIG. 11 is a bottom view of the structure illustrated in FIG. 7.

Optionally, the motor 22 drives the brushroll 11 to roll via the drive belt 13, and the brushroll air-suction channel 122 includes a first air-suction channel 1221 and a second air-suction channel 1222 located at two sides of the drive belt 13. Referring to FIG. 11, the brushroll casing 12 defines the brushroll air-suction channel 122 and a drive-belt mounting chamber 123 in which the drive belt 13 is mounted. The brushroll air-suction channel 122 mainly includes the first air-suction channel 1221 and the second air-suction channel 1222 located at the two sides of the drive belt 13 respectively. The dirty air sucked through the brushroll casing 12 are transmitted into the motor air-suction channel 216 in the motor housing 21 via the first air-suction channel 1221 and the second air-suction channel 1222 respectively, and then flow into the dirt cup 37 for filtration via the air-inlet pipe assembly.

The first air-suction channel 1221 and the second air-suction channel 1222 may be arranged at left and right sides of the drive-belt mounting chamber 123 and spaced apart from each other, such that the dirty air and the dust sucked through the dust suction port of the brushroll casing 12 enter the first air-suction channel 1221 and the second air-suction channel 1222 respectively and then are mixed to flow into the dirt cup 37. Optionally, the first air-suction channel 1221 and the second air-suction channel 1222 may be defined by parts disposed in the brushroll casing 12 or by inner walls of the brushroll casing 12. Certainly, the present disclosure is not limited to this. The first air-suction channel 1221 and the second air-suction channel 1222 may also be communicating with each other. That is, the first air-suction channel 1221 and the second air-suction channel 1222 surround the drive belt 13, and an interior of the brushroll casing 12 except a space occupied by the drive-belt mounting chamber 123 belongs to the first air-suction channel 1221 and the second air-suction channel 1222. The dirty air and the dust sucked through the brushroll casing 12 are transmitted into the dirt cup 37 via the drive-belt mounting chamber 123. Thus, by providing the first air-suction channel 1221 and the second air-suction channel 1222 at the two sides of the drive belt 13, it is possible to realize the dust suction at the two sides of the drive belt 13, so as to enlarge the dust suction range and improve the operation efficiency of the upright vacuum cleaner 1.

Preferably, according to an embodiment of the present disclosure, the first air-suction channel 1221 and the second air-suction channel 1222 are arranged symmetrically with respect to the drive belt 13. That is, the first air-suction channel 1221 and the second air-suction channel 1222 located at the two sides of the drive belt 13 have the same channel length and the same channel sectional area. That is, the first air-suction channel 1221 has a same air suction capacity as the second air-suction channel 1222, such that the dirty air and the dust sucked via the dust suction port equally pass through the first air-suction channel 1221 and the second air-suction channel 1222 and further enter the dirt cup 37 of the motor housing 21, so as to guarantee the uniformity of dust suction at both sides of the drive belt 13.

Figure 12:
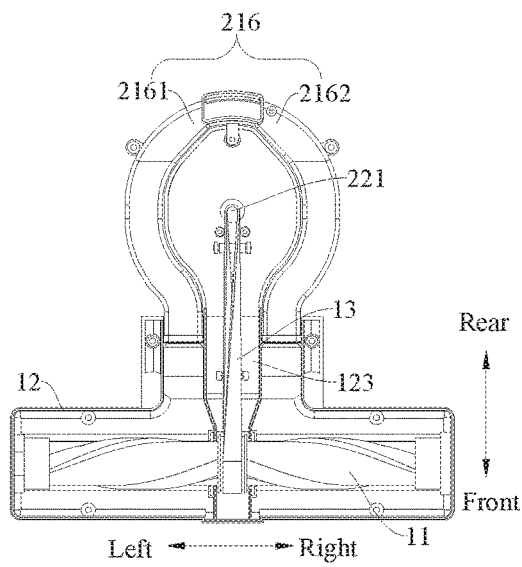
FIG. 12 is a schematic view of an internal channel of the structure illustrated in FIG. 11.
Figure 13:
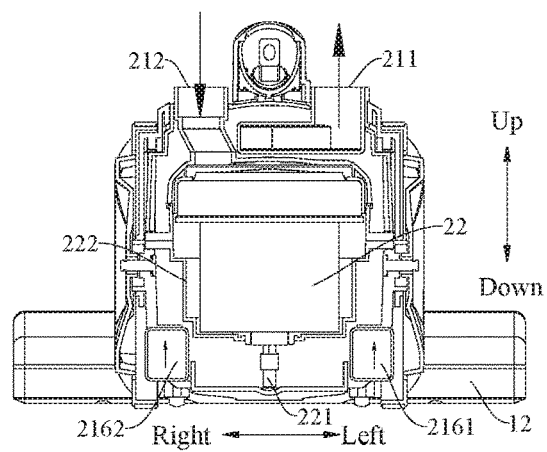
FIG. 13 is a rear view of an internal channel of the structure illustrated in FIG. 8.

According to an embodiment of the present disclosure, the motor air-suction channel 216 includes a first branch channel 2161 communicated to the first air-suction channel 1221 and a second branch channel 2162 communicated to the second air-suction channel 1222. Referring to FIG. 12, the motor housing 21 is configured to have a hollow column shape and defines the first branch channel 2161 and the second branch channel 2162 spaced apart from each other therein. The motor 22 is located between the first branch channel 2161 and the second branch channel 2162, in which a first end of the first branch channel 2161 is communicating with the first air-suction channel 1221 and a first end of the second branch channel 2162 is communicating with the second air-suction channel 1222, while a second end of the first branch channel 2161 and a second end of the second branch channel 2162 are communicating with the dirt cup 37 respectively.

Figure 7:
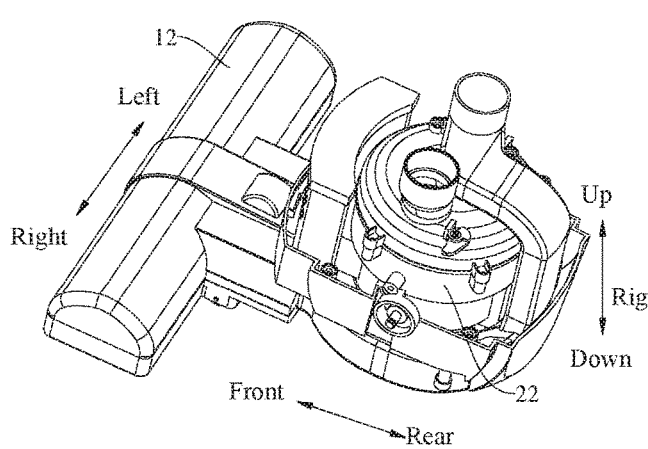
FIG. 7 is an assembling view of a brushroll assembly and a motor assembly of an upright vacuum cleaner according to an embodiment of the present disclosure.
Figure 8:
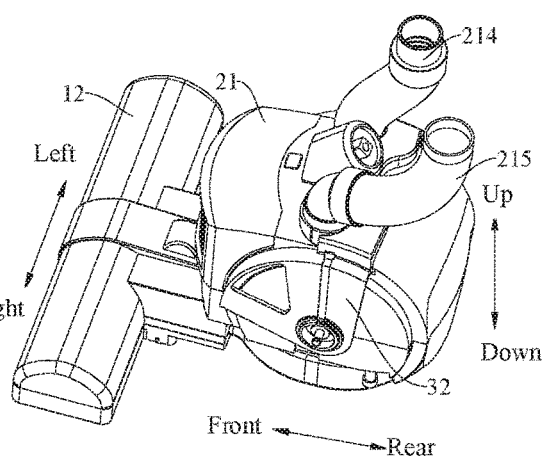
FIG. 8 is an assembling view of a brushroll assembly and a motor assembly of an upright vacuum cleaner according to another embodiment of the present disclosure.
Figure 9:
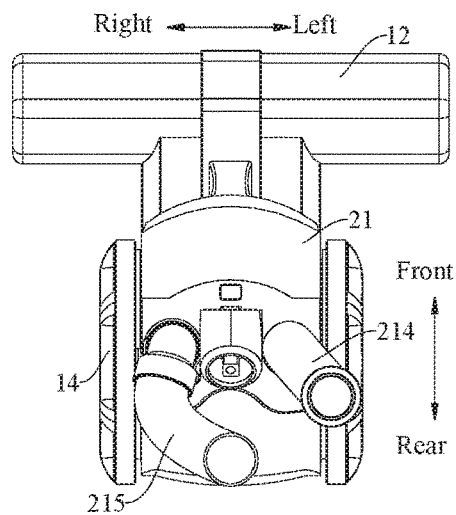
FIG. 9 is a top view of the structure illustrated in FIG. 8.
Figure 10:
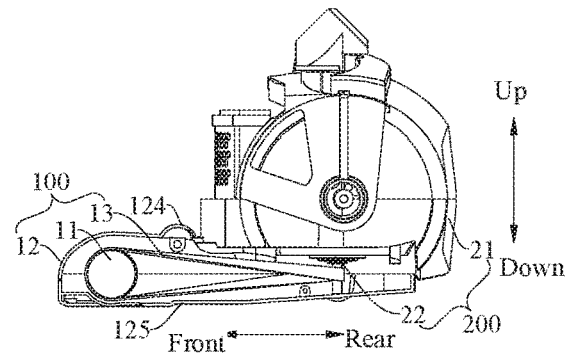
FIG. 10 is a side view of the structure illustrated in FIG. 7.

Further, the motor housing 21 has the dirty air outlet 211 and the clean air inlet 212 communicating with the dirt cup 37, and the first branch channel 2161 and the second branch channel 2162 are converged and then communicating with the dirty air outlet 211. Referring to FIG. 7 to FIG. 9, the dirt cup 37 is located above the motor housing 21, and the motor housing 21 has the dirty air outlet 211 and the clean air inlet 212 spaced apart from each other. The dirty air outlet 211 is communicating with the dust suction port of the brushroll casing 12, the first air-suction channel 1221, the second air-suction channel 1222, the first branch channel 2161 and the second branch channel 2162. The dirty air outlet 211 may be communicating with the dirt cup 37 via the first hose 52. The dirty air and the dust sucked through the dust suction port flow into the motor housing 21 via the first air-suction channel 1221 and the second air-suction channel 1222 located at both sides of the drive belt 13, and then are transmitted to the dirty air outlet 211 via the first branch channel 2161 and the second branch channel 2162 respectively, so as to be transmitted into the dirt cup 37 for filtration.

Optionally, the dirty air outlet 211 is connected to the dirt cup 37 via the air-inlet pipe assembly so as to be communicating with the separating chamber 371. Specifically, as shown in FIG. 6, the two ends of the air-inlet pipe assembly are communicating with the separating chamber 371 of the dirt cup 37 and the dirty air outlet 211 of the motor housing 21 respectively. The dirty air and the dust enter the brushroll air-suction channel 122 through the dust suction port of the brushroll casing 12, then flow into the motor air-suction channel 216 in the motor housing 21, and are further discharged from the dirty air outlet 211 of the motor housing 21 into the separating chamber 371 of the dirt cup 37 to be filtered. The obtained clean air enters the motor air-exhaust channel in the motor housing 21 after sequentially passing through the air-inlet pipe assembly and the clean air inlet 212 of the motor housing 21, and finally are discharged to the outside environment from the air exhaust hole 213 of the motor housing 21. Thus, by providing the air-inlet pipe assembly between the dirt cup 37 and the dirty air outlet 211, it is possible to transmit the dirty air and the dust, so as to guarantee the communication airflow channels.

Alternatively, the first branch channel 2161 and the second branch channel 2162 are disposed opposite to each other and located at left and right sides of the drive belt 13. That is, the first air-suction channel 1221 is communicating with the first branch channel 2161 and both are disposed at the left side of the drive belt 13, while the second air-suction channel 1222 is communicating with the second branch channel 2162 and both are disposed at the right side of the drive belt 13, so that a part of the dirty air and the dust sucked into the brushroll casing 12 through the dust suction port enters the dirt cup 37 after sequentially passing through the first air-suction channel 1221 and the first branch channel 2161, while another part of the dirty air and the dust enters the dirt cup 37 after sequentially passing through the second air-suction channel 1222 and the second branch channel 2162.

Therefore, by providing the first branch channel 2161 and the second branch channel 2162 at the both sides of the motor 22, it is possible to utilize the space between the motor housing 21 and the motor casing 222 effectively so as to provide a compact internal structure and improve the space utilization rate, and also, it is also possible to reduce the number of pipes so as to lower the cost and improve the assembling or disassembling efficiency. Moreover, it is further possible to prevent the dust suction from being affected by the external pipes and also to improve the aesthetic appearance of the upright vacuum cleaner 1.

The first branch channel 2161 and the second branch channel 2162 are defined by the motor casing 222 of the motor 22 and the motor housing 21, and the first branch channel 2161 and the second branch channel 2162 together make up a stereoscopic space with a substantially annular cross section. That is, the motor 22 mainly includes the motor casing 222, a motor body and a motor shaft 221. The motor body is disposed in the motor casing 222, and a first end of the motor shaft 221 is connected to the motor body, and a second end of the motor shaft 221 extends out of the motor casing 222. The motor 22 is moveably disposed in the motor housing 21. An outer wall of the motor casing 222 of the motor 22 is spaced apart from an inner wall of the motor housing 21 to define the first branch channel 2161 and the second branch channel 2162 therebetween, that is, the first branch channel 2161 and the second branch channel 2162 are respectively defined by the motor casing 222 of the motor 22 and the motor housing 21. Certainly, the present disclosure is not limited to this, the first branch channel 2161 and the second branch channel 2162 may also be defined by other parts (such as the pipes) disposed in the motor housing 21 or by the structure of the motor housing 21 itself.

It should be noted that the first branch channel 2161 and the second branch channel 2162 may include the space in the motor housing 21, except a part occupied by the motor 22 and the motor air-exhaust channel. That is, the first branch channel 2161 and the second branch channel 2162 surround a circumference of the motor 22 and are communicating with each other. The first branch channel 2161 and the second branch channel 2162 may be individual passages which are not communicating with an accommodating chamber of the motor housing 21. Of course, the present disclosure is not limited to this. One of the first branch channel 2161 and the second branch channel 2162 may be configured to be an individual passage which is not in communication with the accommodating chamber of the motor housing 21, but the other one of the first branch channel 2161 and the second branch Channel 2162 may be configured to include the space in the accommodating chamber except the motor 22 and the individual passage.

Preferably, the first branch channel 2161 and the second branch channel 2162 are both configured to have a semicircular shape and disposed opposite to each other, so as to define a stereoscopic space of a cylindrical shape in the motor housing 21, in which the motor 21 is mounted in the stereoscopic space. That is, the first branch channel 2161 and the second branch channel 2162 surround the motor 21 at two sides thereof. Thus, the space may be utilized effectively and the space utilization rate may be improved.

According to an embodiment of the present disclosure, the body 31 defines the body air-exhaust channel 311 therein. The first end of the body air-exhaust channel 311 is connected to the air outlet 373 of the dirt cup 37 and communicated to the separating chamber 371, and the second end of the body air-exhaust channel 311 is communicating with the clean air inlet 212.

Referring to FIG. 6, the dirt cup 37 has the air outlet 373 communicating with the separating chamber 371, and the body 31 defines the body air-exhaust channel 311 extending along the length direction of the body 31. The upper end of the body air-exhaust channel 311 is communicating with the air outlet 373 of the dirt cup 37 and the lower end of the body air-exhaust channel 311 is communicating with the motor air-exhaust channel in the motor housing 21. The clean air obtained after being filtered and processed by the dirt cup 37 is discharged from the air outlet 373 of the dirt cup 37, transmitted to the motor air-exhaust channel in the motor housing 21 after sequentially passing through the body air-exhaust channel 311 and the clean air inlet 212 of the motor housing 21, and finally discharged to the outside from the air exhaust hole 213 of the motor housing 21.

Accordingly, by providing the body air-exhaust channel 311 respectively communicating with the air outlet 373 of the dirt cup 37 and the clean air inlet 212 in the body 31, it is possible to omit the arrangement of redundant pipes, such that the number of parts of the upright vacuum cleaner 1 may be reduced to save cost and improve the efficiency of assembling or disassembling the upright vacuum cleaner 1, and also the upright vacuum cleaner 1 has a simple and compact structure. Furthermore, the upright vacuum cleaner 1 is protected from being affected by the external pipes, so as to provide the aesthetic appearance.

Further, the second end (i.e. the lower end shown in FIG. 6) of the body air-exhaust channel 311 is communicating with the clean air inlet 212 through the air exhaust pipe 39. Specifically, the motor 22 is disposed below the body 31, the air exhaust pipe 39 is disposed between the body 31 and the motor housing 21, and two ends of the air exhaust pipe 39 are communicating with the body air-exhaust channel 311 of the body 31 and the clean air inlet 212 of the motor housing 21 respectively. The clean air obtained after being filtered by the dirt cup 37 is introduced into the motor air-exhaust channel in the motor housing 21 after sequentially passing through the body air-exhaust channel 311, the air exhaust pipe 39 and the clean air inlet 212, and finally discharged to the outside from the air exhaust hole 213 of the motor housing 21. Alternatively, the air exhaust pipe 39 may be configured as a straight pipe or a curved pipe extending from an outlet of the body air-exhaust channel 311 to the clean air inlet 212.

Preferably, according to an embodiment of the present disclosure, the dirty air outlet 211 and the clean air inlet 212 are disposed symmetrically with respect to a central axis of the motor housing 21. Referring to FIG. 7, the dirty air outlet 211 and the clean air inlet 212 are disposed at left and right sides of the central axis of the motor housing 21 and spaced apart from each other, so as to make good use of an outer wall of the motor housing 21 and to facilitate the connection with external pipes, thus providing a reasonable and compact layout.

In some specific embodiment of the present disclosure, the upright vacuum cleaner includes a directional control valve 600. That is, the upright vacuum cleaner 1 mainly includes the brushroll assembly 100, the motor assembly 200, the body assembly 300 and the directional control valve 600. Specifically, the brushroll assembly 100 includes the brushroll casing 12 and the brushroll 11 disposed in the brushroll casing 12. The brushroll casing 12 has the dust suction port, and the brushroll casing 12 defines the brushroll air-suction channel 122 communicating with the dust suction port. In other words, the upright vacuum cleaner 1 mainly includes the brushroll assembly 100, the motor assembly 200, the body assembly 300 and the directional control valve 600. The brushroll assembly 100 mainly includes the brushroll casing 12 and the brushroll 11. The brushroll casing 12 defines the brushroll air-suction channel 122 therein. The brushroll casing 12 has the dust suction port communicating with the brushroll air-suction channel 122. The brushroll 11 is rotatably disposed in the brushroll casing 12.

Referring to FIG. 1, the brushroll 11 extends along the horizontal direction (i.e. the left-and-right direction shown in FIG. 1), The motor assembly 200 is located behind the brushroll 11 and connected to the brushroll 11 to drive the brushroll 11 to rotate around a rotation center of the brushroll 11, thus realizing a purpose of cleaning the floor. The dust, the debris and the dirty air swept up by the brushroll 11 enter the brushroll air-suction channel 122 from the dust suction port of the brushroll casing 12, and then are processed in the body assembly 300.

Further, the motor assembly 200 includes the motor housing 21 and the motor 22 disposed in the motor housing 21, and the motor 22 is connected to the brushroll 11 to drive the brushroll 11 to roll. The body assembly 300 includes the body 31 and the dirt cup 37, and the dirt cup 37 is mounted to the body 31. Referring to FIGS. 2 and 3, the motor assembly 200 mainly includes the motor housing 21 and the motor 22. The motor 22 is rotatably disposed in the motor housing 21 and connected to the brushroll 11. Referring to FIG. 6, the body assembly 300 mainly includes the body 31 and the dirt cup 37. The dirt cup 37 is detachably mounted to the body 31. The dirt cup 37 defines the separating chamber 371 therein. The dirty air and the dust enter the brushroll air-suction channel 122 from the dust suction port of the brushroll casing 12, and then flow into the separating chamber 371 of the dirt cup 37 via the motor housing 21. The clean air obtained after being filtered and processed by the dirt cup 37 is discharged to the outside environment.

The directional control valve 600 includes a first air hole 631, a second air hole 632 and a third air hole 633. The first air hole 631 is communicating with the brushroll air-suction channel 122, the second air hole 632 is connected to the air inlet 372 of the dirt cup 37, and the third air hole 633 is communicating with the outside. The directional control valve 600 is configured to switch between a first state in which the first air hole 631 is communicating with the second air hole 632 and a second state in which the second air hole 632 is communicating with the third air hole 633.

Alternatively, the directional control valve 600 is detachably connected to the dirt cup 37 and the motor housing 21. The directional control valve 600 defines an airflow channel therein, and the airflow channel is communicating with the first air hole 631, the second air hole 632 and the third air hole 633 respectively. The first air hole 631 of the directional control valve 600 is communicating with the brushroll air-suction channel 122 via the motor housing 21, the second air hole 632 of the directional control valve 600 is communicating with the dirt cup 37 and the third air hole 633 of the directional control valve 600 is communicating with the outside environment.

Figure 16:
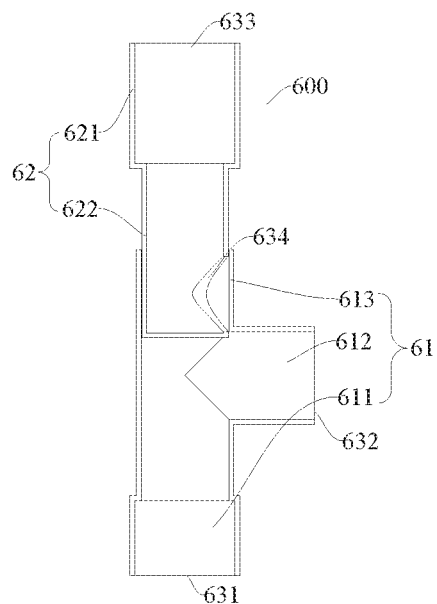
FIG. 16 is a schematic view of a directional control valve of an upright vacuum cleaner according to an embodiment of the present disclosure, in which the directional control valve is at a working state.
Figure 17:
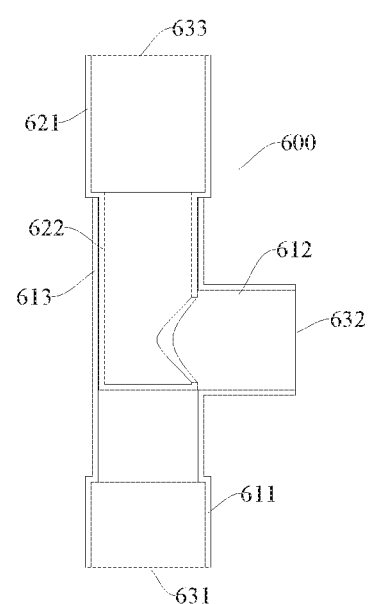
FIG. 17 is a schematic view of a directional control valve of an upright vacuum cleaner according to an embodiment of the present disclosure, in which the directional control valve is at another working state.

Referring to FIGS. 16 and 17, the directional control valve 600 may switch between two working states. When the directional control valve 600 is in the first state, the first air hole 631 of the directional control valve 600 is communicating with the second air hole 632 of the directional control valve 600. That is, the brushroll air-suction channel 122 is communicating with the dirt cup 37, such that the dirty air and the dust sucked through the dust suction port of the brushroll casing 12 sequentially passes through the brushroll air-suction channel 122, the first air hole 631, the airflow channel off the directional control valve 600 and the second air hole 632, and then enter the dirt cup 37 to be filtered. Finally, the obtained clean air is discharged to the outside. When the directional control valve 600 is in the second state, the second air hole 632 of the directional control valve 600 is communicating with the third air hole 633 of the directional control valve 600. That is, the dirt cup 37 is communicating with the outside. Further, the third air hole 633 of the directional control valve 600 may be communicating with an external pipe to implement the dust suction directly through the external pipe without using the brushroll 11. The dirty air and the dust entering through the external pipe sequentially passes through the third air hole 633 of the directional control valve 600, the airflow channel of the directional control valve 600 and the second air hole 632, and then flow into the dirt cup 37 to be filtered. Finally, the obtained clean air is discharged to the outside.

Consequently, by providing the directional control valve 600 to the upright vacuum cleaner 1, the upright vacuum cleaner 1 according to the embodiments of the present disclosure may switch between different dust-suction modes. The user may choose the suitable dust-suction mode according to different working conditions, so as to improve the working efficiency of the upright vacuum cleaner 1 with simple operations and great user experience. Additionally, the motor of the upright vacuum cleaner 1 is vertically arranged to reduce the occupation space of the upright vacuum cleaner 1 and facilitate diverse arrangements of various parts of the upright vacuum cleaner 1. Thus, the upright vacuum cleaner 1 has a simple and compact structure and a high working efficiency, and also is easy to assemble or disassemble.

Alternatively, according to an embodiment of the present disclosure, the directional control valve 600 includes a three-way pipe 61 and a two-way pipe 62. Specifically, the three-way pipe 61 includes a first pipe section 611, a second pipe section 612 and a third pipe section 613 communicating with one another. The first air hole 631 is defined by a free end of the first pipe section 611, and the second air hole 632 is defined by a free end of the second pipe section 612. The two-way pipe 62 includes a fourth pipe section 621 and a fifth pipe section 622 communicating with each other. The third air hole 633 is defined by a free end of the fourth pipe section 621 and the fifth pipe section 622 defines a fourth air hole 634 therein, in which at least a part of the fifth pipe section 622 is inserted into the third pipe section 613 and is movable between a first position in which the first air hole 631 is communicating with the second air hole 632 and a second position in which the fourth air hole 634 is communicating with the second air hole 632.

In other words, the directional control valve 600 mainly includes the three-way pipe 61 and the two-way pipe 62. The three-way pipe 61 mainly includes the first pipe section 611, the second pipe section 612 and the third pipe section 613. A first end of the first pipe section 611, a first end of the second pipe section 612 and a first end of the third pipe section 613 are communicating with one another. A second end of the first pipe section 611 is provided with the first air hole 631, a second end of the second pipe section 612 provided with the second air hole 632. The two-way pipe 62 mainly includes the fourth pipe section 621 and the fifth pipe section 622, in which a first end of the fourth pipe section 621 is connected to a first end of the fifth pipe section 622, a second end of the fourth pipe section 621 is provided with the third air hole 633, and a second end of the fifth pipe section 622 is provided with the fourth air hole 634.

Further, the second end of the fifth pipe section 622 is movably disposed in the third pipe section 613 of the three-way pipe 61. When the two-way pipe 62 is at the first position (i.e. a position shown in FIG. 16), the first air hole 631 of the three-way pipe 61 is only communicating with the second air hole 632, such that the dirty air and the dust sucked through the dust suction port of the brushroll casing 12 enter the dirt cup 37 to be filtered after sequentially passing through the brushroll air-suction channel 122, the first air hole 631 and the second air hole 632 of the three-way pipe 61. Finally, the obtained clean air is discharged to the outside.

When the two-way pipe 62 is at the second position (i.e. a position shown in FIG. 17), the fourth air hole 634 of the two-way pipe 62 is communicating with the second air hole 632 of the three-way pipe 61, and thus the third air hole 633 of the two-way pipe 62 is communicating with the second air hole 632 of the three-way pipe 61. Further, the third air hole 633 of the fourth pipe section 621 may be communicating with the external pipe, so as to implement the dust suction directly through the external pipe without using the brushroll 11. The dirty air and the dust entering through the external pipe sequentially passes through the third air hole 633 of the two-way pipe 62 and the second air hole 632 of the three-way pipe 61 and flow into the dirt cup 37 to be filtered. Finally, the obtained clean air is discharged to the outside.

Consequently, since the two-way pipe 62 and the three-way pipe 61 are detachably provided between the dirt cup 37 and the motor housing 21, and the two-way pipe 62 may switch between the first position and the second position, it is possible to switch the two working states of the directional control valve 600, so as to realize two different dust-suction modes of the upright vacuum cleaner 1. Furthermore, the upright vacuum cleaner 1 has the simple structure, is easy to assemble or disassemble, and is convenient to use.

According to an embodiment of the present disclosure, the first end of the fifth pipe section 622 is connected to the fourth pipe section 621, and an end wall of the second end of the fifth pipe section 622 is closed. The fourth air hole 634 is formed in a side wall of the second end of the fifth pipe section 622. Referring to FIG. 16, the fourth pipe section 621 is configured as a straight pipe section whose two ends are communicated, and the fifth pipe section 622 may be also configured as a straight pipe section. A port of the first end of the fifth pipe section 622 is communicating with the fourth pipe section 621, and the second end of the fifth pipe section 622 is closed. The fourth air hole 634 communicating with the port of the first end of the fifth pipe section 622 is formed in the side wall of the second end of the fifth pipe section 622.

When the fifth pipe section 622 is inserted in the third pipe section 613 of the three-way pipe 61, the fifth pipe section 622 may reciprocate along a length direction of the third pipe section 613. When the two-way pipe 62 is in the first position, the second end of the fifth pipe section 622 blocks a port of the third pipe section 613, while a side wall of the third pipe section 613 blocks the fourth air hole 634 of the fifth pipe section 622, such that the first air hole 631 is only communicating with the second air hole 632, i.e. realizing the first state of the directional control valve 600. When the two-way pipe 62 is in the second position, the second end of the fifth pipe section 622 blocks the first air hole 631 of the first pipe section 611, while the second air hole 632 of the second pipe section 612 is communicating with the fourth air hole 634 of the fifth pipe section 622, such that the third air hole 633 of the fourth pipe section 621 is communicating with the second air hole 632 of the second pipe section 612, i.e. realizing the second state of the directional control valve 600.

Therefore, since the fifth pipe section 622 is configured to have the opened first end and the closed second end, and define the fourth air hole 634 in the side wall of the second end, it is possible to switch two communication states of the directional control valve 600, so as to realize two different dust-suction modes of the upright vacuum cleaner 1. Further, the upright vacuum cleaner 1 has the simple structure, is easy to assemble or disassemble, and is convenient to use.

Further, when the two-way pipe 62 moves to the second position, the end of the fourth pipe section 621 connected to the fifth pipe section 622 abuts against the free end of the third pipe section 613. Referring to FIG. 17, the fourth pipe section 621 has an external diameter greater than the fifth pipe section 622 to form a boss between the fourth pipe section 621 and the fifth pipe section 622. When the two-way pipe 62 is at the second position, the boss between the fourth pipe section 621 and the fifth pipe section 622 abuts against the end of the third pipe section 613. Consequently, the boss formed between the fourth pipe section 621 and the fifth pipe section 622 has a positioning function to guarantee the communication between the fourth air hole 634 of the fifth pipe section 622 and the second air hole 632 of the second pipe section 612, so as to communicate the second air hole 632 with the third air hole 633, which provides a simple structure, thus is easy to manufacture and process, and realizes accurate positioning.

The upright vacuum cleaner 1 further includes a second hose (not shown). A first end of the second hose is communicated to the outside air and a second end of the second hose is connected to the third air hole 633.

That is, the second end of the second hose is detachably connected to the fourth pipe section 621 of the directional control valve 600. When the directional control valve 600 is in the second state, the second air hole 632 of the directional control valve 600 is communicating with the third air hole 633. That is, the dirt cup 37 is communicating with the outside. Specifically, the third air hole 633 of the directional control valve 600 may be communicating with the outside via the second hose, and the user may implement the dust suction directly through the first end of the second hose (without using the brushroll 11). The dirty air and the dust entering through the second hose sequentially passes through the third air hole 633 of the directional control valve 600, the airflow channel of the directional control valve 600, and the second air hole 632 of the directional control valve 600, and flow into the dirt cup 37. The clean air obtained after being filtered is discharged to the motor air-exhaust channel of the motor housing 21 from the air outlet 373 of the dirt cup 37. Finally, the clean air is discharged to the outside from the air exhaust hole 213 of the motor housing 21.

Alternatively, a length of the second hose may be greater than that of the body 31 to prolong the separation time and the transmission time of the dust and the dirty air and also to increase the dust suction capacity, thus improving the working efficiency of the upright vacuum cleaner 1. Further, a middle part of the second hose may be hanged to the body 31 to provide a compact structure. Alternatively, the second hose may be a plastic hose or a rubber hose, so as to facilitate coiling up the second hose to save space and improve the space utilization rate. Therefore, the upright vacuum cleaner 1 has the simple and compact structure and is easy to assemble or disassemble. The user may choose the suitable dust-suction mode according to the specific working condition, and thus the upright vacuum cleaner 1 is simple to operate and provides great user experience.

Figure 18:
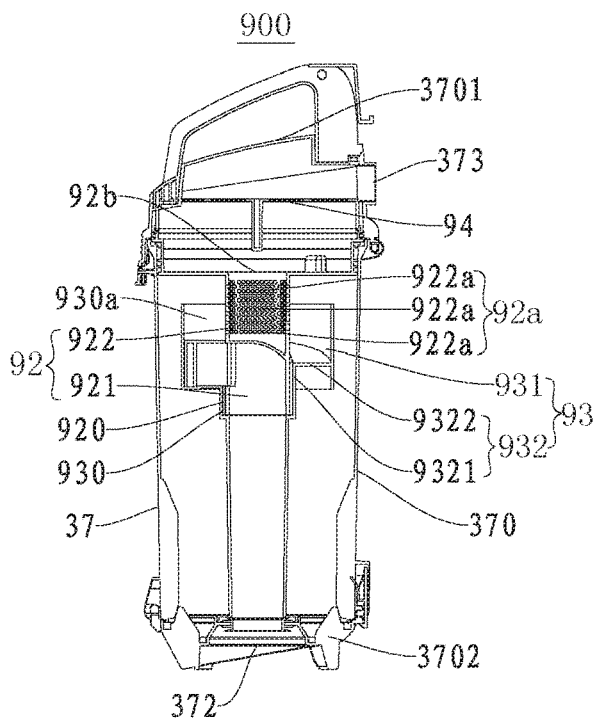
FIG. 18 is a schematic view of a cyclonic separating device according to an embodiment of the present disclosure.
Figure 19:
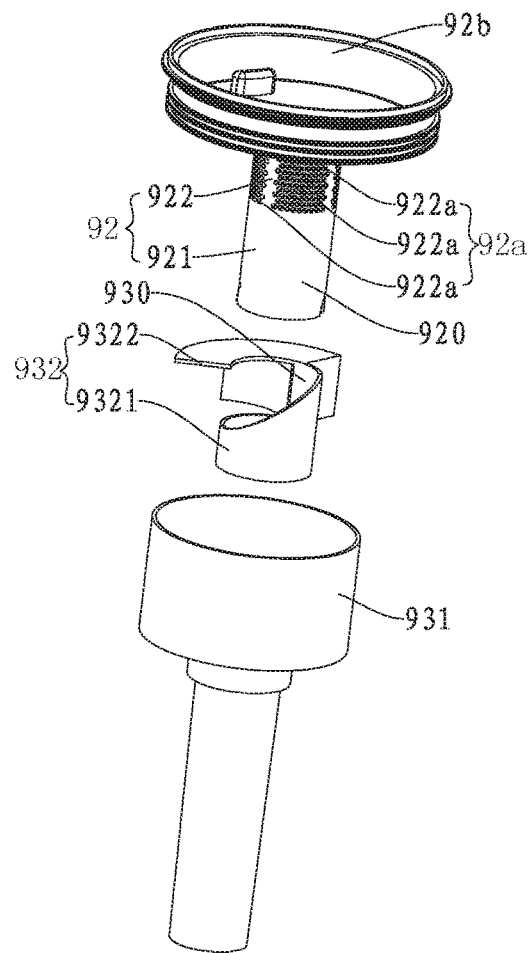
FIG. 19 is an exploded view of a partial structure of a cyclonic separating device according to an embodiment of the present disclosure.
Figure 20:
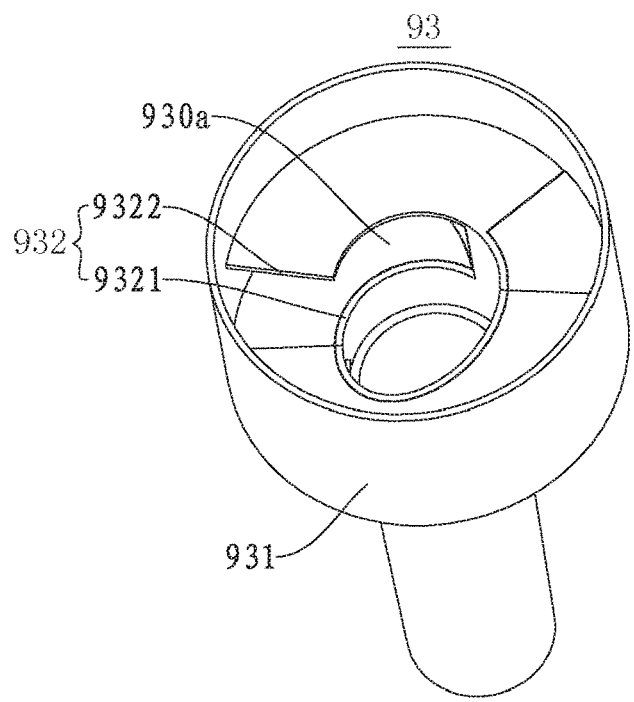
FIG. 20 is a perspective view of a cyclonic cone assembly of a cyclonic separating device according to an embodiment of the present disclosure.

As shown in FIG. 18 to FIG. 20, the dirt cup 37 has the air inlet 372 and the air outlet 373. The dirty air with impurities (such as dust and debris) may enter the dirt cup 37 through the air inlet 372. After filtration of a subsequent filter 92, the impurities may be intercepted in the dirt cup 37, and the clean air may be exhausted from the air outlet 373, so as to realize the separation of the impurities and the air.

In some other specific embodiments of the present disclosure, the upright vacuum cleaner 1 further includes a cyclonic separating device 900. Specifically, the cyclonic separating device 900 includes a filter 92 and a cyclonic cone assembly 93. The filter 92 may be provided in the dirt cup 37. As shown in FIG. 18, the filter 92 includes a filter inlet 92a and a filter outlet 92b communicated between the filter inlet 92a and the air outlet 373. The dirty air entering the dirt cup 37 may flow into the filter 92 through the filter inlet 92a, and the clean air after filtration of the filter 92 may be exhausted from the air outlet 373 after passing through the filter outlet 92b, so as to complete the separation of the impurities and the air.

As shown in FIGS. 18 to 20, the cyclonic cone assembly 93 includes a cyclone 931 and a cyclonic guide 932. Specifically, a first end of the cyclone 931 may be communicating with the air inlet 372, and the cyclonic guide 932 may be fitted in a second end of the cyclone 931 and detachably fitted over the filter 92, so as to spirally guide the dirty air introduced into the cyclone 931 through the air inlet 372 to the filter inlet 92a.

That is, the dirty air introduced into the cyclone 931 through the air inlet 372 may flow spirally under the guidance of the cyclonic guide 932, and then enter the filter 92 through the filter inlet 92a to be filtered by the filter 92. The dust and the debris may be intercepted by the filter 92, and the cleaned air may flow out from the filter outlet 92b and further flow out of the dirt cup 37 via the air outlet 373, thus completing the separation. Since the dirty air spirally flows into the filter 92 through the filter inlet 92a, it is possible to prevent hairs from be enwound upon the filter 92 to some extent.

Moreover, as the cyclonic guide 932 is detachably fitted over the filter 92, the filter 92 may be cleaned after the cyclonic cleaner 932 is removed from the filter 92, so as to solve the problem that it is difficult to clean up the filter 92 due to the hairs enwound thereon.

In the cyclonic separating device 900 of the upright vacuum cleaner according to the embodiments of the present disclosure, the dirty air that enters the cyclone 931 through the air inlet 372 is spirally guided to the filter inlet 92a of the filter 92, and the cyclonic guide 932 of the cyclonic cone assembly 93 is detachably fitted over the filter 92, so it is possible to address the problem of enwound hairs and it is convenient to clean the cyclonic separating device 900.

According to some embodiments of the present disclosure, as shown in FIG. 18 and FIG. 19, the cyclonic guide 932 includes a first cylindrical surface 930, and the filter 92 includes a second cylindrical surface 920. The cyclonic guide 932 may be detachably fitted over the filter 92 by the first cylindrical surface 930 and the second cylindrical surface 920. Consequently, the cyclonic guide 932 may be stably and closely fitted with the filter 92, which is easy to assemble or disassemble and provides high reliability. Additionally, the cyclonic guide 932 and the filter 92 are fitted with each other by the cylindrical surfaces, so as to facilitate cleaning up the enwound hairs.

As an alternative embodiment, as shown in FIG. 18 and FIG. 19, the filter 92 may be configured as a cylinder with an open end (e.g. an upper end shown in FIG. 18) and a closed end (e.g. a lower end shown in FIG. 18). The open end of the filter 92 may define the filter outlet 92b and the filter inlet 92a may be formed in a side wall of the filter 92. Therefore, the dirty air may enter the filter 92 through the filter inlet 92a in the side wall of the filter 92, and the cleaned air may flow out from the filter outlet 92b at the open end after filtration. Thus, the filter 92 is easy to manufacture and has a good filtration effect.

Further, the filter 92 may include a first section 921 and a second section 922. As shown in FIG. 18 and FIG. 19, the first section 921 may be configured to be a solid cylinder while the second section 922 may be configured to be a hollow cylinder. A first end (e.g. a lower end shown in FIG. 18) of the second section 922 is connected to a first end (e.g. an upper end shown in FIG. 18) of the first section 921 and a second end (e.g. an upper end shown in FIG. 18) of the second section 922 is opened to define the filter outlet 92b. The filter inlet 92a may be formed in the side wall of the second section 922. Accordingly, the filter 92 has a simple and compact structure and is easy to manufacture and process. Moreover, the first section 921 and the second section 922 are both cylindrical, and are not blocked by other external parts. If hairs are enwound on the filter 92, the cyclonic guide 932 may be removed from the filter 92 to clean up the hairs enwound on the filter 92, which is easy to assemble and dissemble with less effort. Also, such filter 92 may shorten a flow path of air effectively to improve the filtration efficiency.

Alternatively, the filter inlet 92a may include a plurality of filter pores 922a that are evenly distributed in an axial direction and/or in a circumferential direction of the second section 922 and spaced apart from one another. In other words, the plurality of filter pores 922a may be distributed evenly along the axial direction of the second section 922 and spaced apart from one another. Or, the plurality of filter pores 922a may be distributed evenly along the circumferential direction of the second section 922 and spaced apart from one another. Or, the plurality of filter pores 922a may be distributed evenly along the axial and circumferential directions of the second section 922 and spaced apart from one another, as shown in FIG. 18 and FIG. 19. On one hand, large particle impurities (such as debris) may be intercepted by the filter pores 922a to realize preliminary separation of the dirty air; on the other hand, the dirty air may enter the filter 92 evenly to reduce the probability of the dirty air forming an eddy due to an uneven air intake, thus improving the filtration efficiency.

In some embodiments of the present disclosure, as shown in FIG. 18 to FIG. 20, the cyclonic guide 932 may include a sleeve 9321 and a guide plate 9322. A part of the sleeve 9321 is fitted over the first section 921 of the solid cylindrical structure to avoid blocking the filter inlet 92a in the second section 922. The guide plate 9322 may be provided between the sleeve 9321 and the cyclone 931 to define a spiral channel 930a along with the sleeve 9321 and the cyclone 931. In the spiral channel 930a, the dirty air spirally flows from the air inlet 372 to the filter inlet 92a. For example, as shown in FIGS. 18 to 20, the sleeve 9321 is disposed in the cyclone 931, the guide plate 9322 is provided between the sleeve 9321 and the cyclone 931, and the guide plate 9322 extends spirally from the first section 921 to the second section 922, so that the sleeve 9321, the cyclone 931 and the guide plate 9322 define the spiral channel 930a together, and thus the dirty air with dust and debris flows spirally in the spiral channel 930a when flowing from the air inlet 372 to the filter inlet 92a. Thus, the dirty air may flow smoothly, and the debris and hairs in the dirty air may be thrown out under a centrifugal force during the spiral flowing, so as to reduce the probability of the filter 92 being enwound by the hairs.

Alternatively, the sleeve 9321 and the guide plate 9322 are molded integrally. That is, the cyclonic guide 932 may be molded in one piece, thus facilitating processing and providing a low cost. In addition, the spiral channel 930a defined in the cyclonic guide 932 has a firm structure and thus is hard to be failed and deformed, so as to improve the working reliability of the cyclonic guide 932.

According to some embodiments of the present disclosure, the cyclone 931 and the cyclonic guide 932 may be fixedly connected to each other, i.e. without relative movement between the cyclone 931 and the cyclonic guide 932. Thus, the stability and the reliability between the cyclone 931 and the cyclonic guide 932 may be enhanced to reduce the probability of being damaged.

Alternatively, the cyclone 931 and the cyclonic guide 932 may be connected in a threaded joint manner. For example, the cyclone 931 may be connected to the cyclonic guide 932 by a screw. Or, the cyclone 931 and the cyclonic guide 932 may be connected in a hot-melt-joint manner via ultrasonic waves to further enhance the fastness and reliability of the connection therebetween.

In order to improve the separation effect of the cyclonic separating device 900, the cyclonic separating device 900 may further include a filter cotton assembly 94. As shown in FIG. 18, the filter cotton assembly 94 may be provided in the dirt cup 37 and located between the filter outlet 92b and the air outlet 373. Thus, the air after filtration of the filter 92 may be filtered again by the filter cotton assembly 94 to intercept small particle impurities (such as dust) to improve the purity of the air exhausted from the air outlet 373.

Alternatively, the dirt cup 37 may be transparent. Since the dirt cup 37 is transparent, the user may observe the filtration in the cyclonic separating device 900 conveniently. If there are too many impurities intercepted in the cyclonic separating device 900, the user may remove the dirt cup 37 to clean the cyclonic separating device 900 and also to clear the impurities intercepted in the dirt cup 37, and finally mount the cleaned cyclonic separating device 900 back for further use. Or, if hairs are enwound upon the filter 92, the user may remove the cyclonic guide 932 from the filter 92 to clear up the hairs enwound upon the filter 92, and then mount the cyclonic guide 932 and the filter 92 back into the dirt cup 37 for further use.

In some embodiments of the present disclosure, the dirt cup 37 may include a dirt-cup body 370, a dirt-cup upper cover 3701 and a dirt-cup lower cover 3702. As shown in FIG. 18, the dirt-cup lower cover 3702 and the dirt-cup upper cover 11 may be provided at lower and upper ends of the dirt-cup body 370 respectively, in which the air inlet 372 may be formed in the dirt-cup lower cover 3702, while the air outlet 373 may be formed in the dirt-cup upper cover 11.

Alternatively, as shown in FIG. 18, the air inlet 372 may be formed in a bottom wall of the dirt-cup lower cover 3702, and the air outlet 373 may be formed in a side wall of the dirt-cup upper cover 3701, so as to improve the aesthetics and to facilitate an overall layout of an air channel system of the upright vacuum cleaner.

The working process of the cyclonic separating device 900 of the upright vacuum cleaner 1 according to the embodiments of the present disclosure will be descried in detail with reference to FIGS. 18 to 20.

When the upright vacuum cleaner 1 operates, a vacuuming device sucks the dirty air with dust and debris, the dirty air enters the dirt cup 37 through the air inlet 372 in the dirt-cup lower cover 3702, and flows into the cyclone 931 through a lower end of the cyclone 931 to move from down to up in the cyclone 931.

Then, the dirty air enters the cyclonic guide 932 and flows spirally in the spiral channel 930a defined by the sleeve 9321, the cyclone 931 and the cyclonic guide 932 together.

In such a case, the impurities (such as debris and hairs) may be thrown out under the centrifugal force, so as to prevent the hairs from being enwound upon the filter 92.

The dirty air may enter the filter 92 via the filter pores 922a in the side wall of the second section 922 after flowing through the spiral channel 930a. The filter pores 922a may intercept the impurities (such as debris) in the dirty air to implement the preliminary separation of impurities.

Subsequently, the air entering the filter 92 may flow to the filter cotton assembly 94 through the filter outlet 92b, and the small particle impurities (such dust) in the dirty air may be intercepted by the filter cotton assembly 94. The cleaned air may pass through the filter cotton assembly 94, thus implementing further separation.

Finally, the cleaned air is exhausted from the air outlet 373 in the dirt-cup upper cover 3701, and the impurities are intercepted in the dirt cup 37, thus completing the separation of the impurities and the air in the dirty air.

If hairs are enwound upon the filter 92, the user may remove the cyclonic guide 932 from the filter 92 to clear up the hairs enwound upon the filter 92, and then mount the cyclonic guide 932 and the filter 92 back into the dirt cup 37 for further use.

When the cyclonic separating device 900 is used for a period of time, the user may find that there are too many impurities intercepted in the cyclonic separating device 900. In such case, the user may remove the dirt cup 37 to clean the cyclonic separating device 900 and also to clear the impurities intercepted in the dirt cup 37, and finally mount the cleaned cyclonic separating device 900 back for further use.

In conclusion, in the cyclonic separating device 900 of the upright vacuum cleaner according to the embodiments of the present disclosure, the dirty air that enters the cyclone 931 through the air inlet 372 is spirally guided to the filter inlet 92a of the filter 92, and the cyclonic guide 932 of the cyclonic cone assembly 93 is detachably fitted over the filter 92, so it is possible to prevent the filter 92 from being enwound by hairs and it is convenient to clean the cyclonic separating device 900.

The structure and the operation process of the upright vacuum cleaner 1 according to the embodiments of the present disclosure will be described with reference to the accompanying drawings.

As shown in FIGS. 1 to 20, the upright vacuum cleaner 1 mainly includes the brush assembly 100, the motor assembly 200, the body assembly 300, a clutch device (not shown) and a wheel 38.

Figure 14:
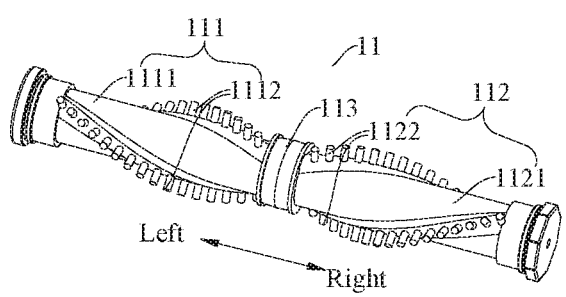
FIG. 14 is a schematic view of a brush roll of an upright vacuum cleaner according to an embodiment of the present disclosure.

The brush assembly 100 mainly includes the brushroll 11 and the brushroll casing 12. The brushroll casing 12 defines the drive-belt mounting chamber 123, and the first air-suction channel 1221 and the second air-suction channel 1222 respectively located at left and right sides of the drive-belt mounting chamber 123. The brushroll 11 is rotatably disposed in the brushroll casing 12, and the drive belt 13 is movably disposed in the drive-belt mounting chamber 123. Further, an end of the drive belt 13 is winded upon a middle part of the brushroll 11. Referring to FIG. 14, the brushroll 11 mainly includes the first brushroll section 111, the second brushroll section 112 and the connecting-shaft section 113 disposed coaxially. The first brushroll section 111 and the second brushroll section 112 are connected to two ends of the connecting-shaft section 113 respectively. The end of the drive belt 13 is winded upon the connecting-shaft section 113 of the brushroll 11. The motor assembly 200 includes the motor housing 21, the motor 22 and a fan. The motor housing 21 defines the motor air-suction channel 216 and the motor air-exhaust channel spaced apart from each other. The motor housing 21 has the dirty air outlet 211 communicating with the motor air-suction channel 216, and the clean air inlet 212 communicating with the motor air-exhaust channel. The motor 22 is disposed vertically inside the motor housing 21 and is rotatable with respect to the motor housing 21. That is, the motor shaft 221 of the upright vacuum cleaner 1 is arranged along the vertical direction, the motor 22 is disposed behind the brushroll 11 and the motor shaft 221 of the motor 22 is connected to the brushroll 11 via the drive belt 13. Specifically, the first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the drive belt 13 to move, and the drive belt 13 drives the brushroll 11 to rotate around its own rotating axis. Thus, the motor 22 drives the brushroll 11 to rotate. Since an axial direction of the motor shaft 221 of the motor 22 is not parallel with an axial direction of the brushroll 11, the drive belt 13 between the brushroll 11 and the motor shaft 221 is twisted for one time with a twist angle of 30° to 90°. Further, the motor 22 may drive the fan to rotate so as to generate a vacuuming airflow to provide a vacuuming power for the upright vacuum cleaner 1, and the motor 22 may also drive the brushroll 11 to rotate around its own axis so as to realize the purpose of cleaning the floor.

Figure 15:
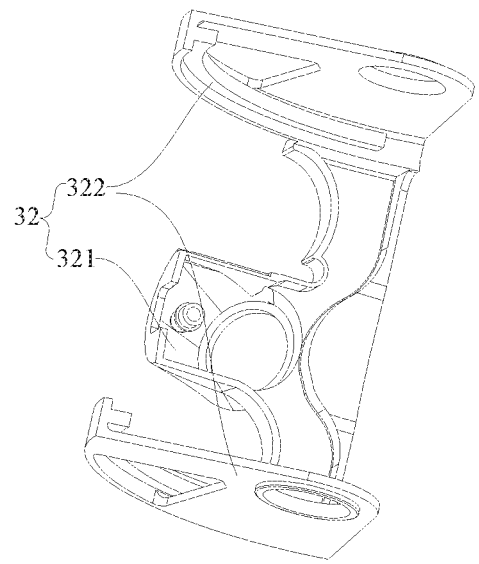
FIG. 15 is a schematic view of a bridging member of an upright vacuum cleaner according to an embodiment of the present disclosure.

The body assembly 300 includes the body 31, a bridging member 32 and the dirt cup 37, in which the dirt cup 37 and the bridging member 32 are mounted to the body 31 respectively. The bridging member 32 is connected to a lower end of the body 31. Referring to FIG. 15, the bridging member 32 mainly includes two side plates 322 and a top plate 321 provided between the two side plates 322. Each side plate 322 of the bridging member 32 is disposed at an outer side of a side wall of the motor housing 21 and rotatably connected to the motor housing 21. Meanwhile, the rotatable wheel 38 is provided at an outer side of each side plate 322 of the bridging member 32, so that it is convenient for the user to push the upright vacuum cleaner 1 when the upright vacuum cleaner 1 operates. The vacuum cleaner defines the separating chamber 371 therein. The body 31 defines a body air-exhaust channel 311 therein. An air-exhaust pipe 39 is provided between the body 31 and the motor housing 21. Two ends of the air-exhaust pipe 39 are communicating with the body air-exhaust channel 311 of the body 31 and the clean air inlet 212 of the motor housing 21 respectively. The dust and debris sucked through the dust-suction port of the brushroll casing 12 are transmitted into the motor air-suction channel 216 of the motor housing 21 via the first air-suction channel 1221 and the second air-suction channel 1222 respectively, and then flow into the separating chamber 371 of the dirt cup 37 to be filtered. The cleaned air is discharged to the motor air-exhaust channel of the motor housing 21 from the air outlet 373 of the dirt cup 37, and finally discharged to the outside from the air-exhaust hole 213 of the motor housing 21.

An actuating member of the clutch device is rotatably mounted to the motor housing 21 and fitted with the bridging member 32 and the motor casing 222 of the motor 22 respectively, such that the bridging member 32 may drive the clutch device to rotate, and thus the clutch device may drive the motor 22 to rotate.

Referring to FIG. 1, when the upright vacuum cleaner 1 is in the non-working state, the upright vacuum cleaner 1 may be placed upright on the floor, i.e. the body 31 of the upright vacuum cleaner 1 is located at the second upright position, thus occupying a small space. If the user needs to use the upright vacuum cleaner 1, the user may hold a handle of the body 31 by hands to push the upright vacuum cleaner 1 to operate. First, the user may turn on the switch of the upright vacuum cleaner 1, in which case the drive belt 13 is in the loosened state, and the motor 22 cannot drive the brushroll 11 to rotate. That is, the upright vacuum cleaner 1 is in a stand-by state where the brushroll 11 does not sweep dust. Then, the body 31 is rotated from the second upright position to the second oblique position by hands, and in such process, the bridging member 32 on the motor housing 21 rotates clockwise along with the body 31 relative to the motor housing 21, such that the bridging member 32 drives the motor 22 in the motor housing 21 to rotate by driving the clutch device on the motor housing 21. That is, the motor 22 is rotated from the first oblique position to the first upright position. In this process, the lower end of the motor shaft 221 moves backwards gradually, such that the distance between the lower end of the motor shaft 221 and the brushroll 11 is increased, and thus the drive belt 13 is tensioned. Therefore, the motor 22 may drive the brushroll 11 to rotate by the drive belt 13, so as to start the operations of dust sweep and dust suction. Of course, the present disclosure is not limited to this. The user may rotate the body 31 from the second upright position to the second oblique position directly, in which process the drive belt 13 is tensioned gradually, and then the switch of the upright vacuum cleaner 1 is turned on to implement the operations of dust sweep and dust suction simultaneously.

That is, the user just needs to turn on the switch and then manipulate a direction of the handle of the body 31, so as to start or stop the dust sweep with simple manipulations, instead of manipulations on a control interface. Alternatively, the switch may be provided to the handle of the body 31 to facilitate manipulations by hands, or may be provided to the brushroll casing 12 or the motor housing 21 below the body 31 to make it convenient for the user to turn on the switch by feet. The motor 22 may be disposed near the floor. That is, the gravity center of the motor 22 is lower than that of the motor 22 of the vacuum cleaner in the related art, such that among the upright vacuum cleaners having the body 31 of the same length, the upright vacuum cleaner 1 in the present disclosure is easier to manipulate with less effort.

When the upright vacuum cleaner 1 is in the working state, the dirty air and the dust are introduced into the brushroll air-suction channel 122 via the dust-suction port of the brushroll casing 12, then flow into the motor air-suction channel 216 in the motor housing 21, and farther discharged into the body assembly 300 via a dirty air output pipe 214 on the motor housing 21. The clean air obtained by filtration of the body assembly 300 enters the motor air-exhaust channel in the motor housing 21 via a clean air input pipe 215 on the motor housing 21. The air-exhaust pipe 39 is disposed between the body 31 and the motor housing 21, and two ends of the air-exhaust pipe 39 are communicating with the body air-exhaust channel 311 of the body 31 and the clean air inlet 212 of the motor housing 21 respectively. The clean air obtained by filtration of the dirt cup 37 is introduced into the motor air-exhaust channel in the motor housing 21 after sequentially passing through the body air-exhaust channel 311, the air-exhaust pipe 39 and the clean air inlet 212, and finally discharged to the outside from the air-exhaust hole 213 of the motor housing 21.

It shall be noted that when the body 31 is rotated from the second upright position to the second oblique position at the predetermined angle, the motor 22 may rotate synchronously along with the body 31. When the body 31 rotates to the predetermined angle, the body 31 may be manipulated freely by hands without any impact on the tensioned state of the drive belt 13. That is, when the motor 22 rotates from the first oblique position to the first upright position, the body 31 may be manipulated freely by hands without affecting the dust sweep and the dust suction of the upright vacuum cleaner 1. Of course, the present disclosure is not limited to this. The rotation angle of the body 31 may be directly associated with the rotation angle of the motor 22, i.e. the position state of the motor 22 may be adjusted through adjusting the oblique angle of the body 31 by hands so as to adjust the tension degree of the drive belt 13.

The other configurations and manipulations of the upright vacuum cleaner 1 according to the embodiments of the present disclosure are known to those skilled in the art, which will not be elaborated herein.

Reference throughout this specification to "an embodiment," "some embodiments," "an example," "specific examples" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present disclosure have been shown and illustrated, it shall be understood by those skilled in the art that various changes, modifications, alternatives and variants without departing from the principle and spirit of the present disclosure are acceptable. The scope of the present disclosure is defined by the claims or the like.

What is claimed is:

1. An upright vacuum cleaner, comprising:
    a brushroll assembly comprising a brushroll casing and a brushroll disposed in the brushroll casing, the brushroll casing having a dust suction port and defining a brushroll air-suction channel communicating with the dust suction port;
    a motor assembly comprising a motor housing and a motor disposed in the motor housing, the motor housing having an air exhaust hole, a dirty air outlet and a clean air inlet, and defining a motor air-suction channel and a motor air-exhaust channel, the motor air-suction channel being communicated between the brushroll air-suction channel and the dirty air outlet, and the motor air-exhaust channel being communicated between the clean air inlet and the air exhaust hole;
    a drive belt connecting the motor and the brushroll, the drive belt being disposed between a first air suction channel and a second air suction channel of the brushroll air-suction channel, the motor driving the brushroll to roll via the drive belt; and
    a body assembly comprising a body and a dirt cup mounted to the body, the dirt cup having a separating chamber communicating with the dirty air outlet and the clean air inlet respectively.

2. The upright vacuum cleaner according to claim 1, wherein the dirty air outlet is connected to the dirt cup by an air-inlet pipe assembly so as to be communicating with the separating Chamber.

3. The upright vacuum cleaner according to claim 2, wherein the air-inlet pipe assembly comprises:
an air-inlet pipe provided to the motor housing and having a first end connected to the dirty air outlet; and
a first hose connected between a second end of the air-inlet pipe and an air inlet of the dirt cup.

4. The upright vacuum cleaner according to claim 3, wherein the first hose is detachably connected between the second end of the air-inlet pipe and the air inlet of the dirt cup.

5. The upright vacuum cleaner according to claim 1, wherein the body defines a body air-exhaust channel having a first end connected to an air outlet of the dirt cup and communicating with the separating chamber, and a second end communicating with the clean air inlet.

6. The upright vacuum cleaner according to claim 1, wherein the first air-suction channel and the second air-suction channel are arranged symmetrically with respect to the drive belt.

7. The upright vacuum cleaner according to claim 1, wherein the motor air-suction channel comprises a first branch channel communicated to the first air-suction channel and a second branch channel communicated to the second air-suction channel, and the first branch channel and the second branch channel are converged and then communicated to the dirty air outlet.

8. The upright vacuum cleaner according to claim 7, wherein the first branch channel and the second branch channel are defined by a motor casing of the motor and the motor housing, and the first branch channel and the second branch channel together form a stereoscopic space with a substantially annular cross section.

9. The upright vacuum cleaner according to claim 1, wherein the dirty air outlet and the clean air inlet are arranged axially symmetrically with respect to a central line of the motor housing.

10. The upright vacuum cleaner according to claim 1, further comprising:
a directional control valve having a first air hole, a second air hole and a third air hole, wherein the first air hole is communicating with the brushroll air-suction channel, the second air hole is communicating with the air inlet of the dirt cup, the third air hole is communicating with outside air, and the directional control valve is configured to switch between a first state in which the first air hole and the second air hole are communicated and a second state in Which the second air hole and the third air hole are communicated.

11. The upright vacuum cleaner according to claim 10, wherein the directional control valve comprises:
a three-way pipe comprising a first pipe section, a second pipe section and a third pipe section communicating with one another, the first air hole being defined by a free end of the first pipe section and the second air hole being defined by a free end of the second pipe section; and
a two-way pipe comprising a fourth pipe section and a fifth pipe section communicating with each other, the third air hole being defined by a free end of the fourth pipe section and the fifth pipe section defining a fourth air hole therein, wherein at least a part of the fifth pipe section is inserted into the third pipe section and is movable between a first position in which the first air hole is communicating with the second air hole and a second position in which the fourth air hole is communicating with the second air hole.

12. The upright vacuum cleaner according to claim 11, wherein a first end of the fifth pipe section is connected to the fourth pipe section and a second end of the fifth pipe section has a closed end wall, and the fourth air hole is formed in a side wall of the second end of the fifth pipe section.

13. The upright vacuum cleaner according to claim 11, wherein an end of the fourth pipe section connected to the fifth pipe section abuts against a free end of the third pipe section when the two-way pipe moves to the second position.

14. The upright vacuum cleaner according to claim 1, wherein the dirt cup comprises an air inlet and an air outlet, and the body assembly further comprises:
a filter provided in the dirt cup and having a filter inlet and a filter outlet, the filter outlet being communicated between the filter inlet and the air outlet; and
a cyclonic cone assembly having a cyclone and a cyclonic guide, wherein a first end of the cyclone is communicating with the air inlet, and the cyclonic guide is fitted in a second end of the cyclone and is detachably fitted over the filter to spirally guide dirty air introduced into the cyclone through the air inlet to the filter inlet.

15. The upright vacuum cleaner according to claim 14, wherein the cyclonic guide has a first cylindrical surface, the filter has a second cylindrical surface, and the cyclonic guide is detachably fitted over the lifter by the first cylindrical surface and the second cylindrical surface.

16. The upright vacuum cleaner according to claim 15, wherein the filter is configured as a cylinder having an open end and a closed end, the open end of the filter defines the filter outlet and the filter inlet is formed in a side wall of the filter.

17. The upright vacuum cleaner according to claim 16, wherein the filter comprises a first section and a second section, the first section is configured to the a solid cylinder while the second section is configured to be a hollow cylinder, a first end of the second section is connected to a first end of the first section, a second end of the second section is open to define the filter outlet, and the filter inlet is formed in a side wall of the second section.

18. The upright vacuum cleaner according to claim 17 wherein the filter inlet comprises a plurality of filter pores evenly distributed in an axial direction and/or in a circumferential direction of the second section and spaced apart from one another.

19. The upright vacuum cleaner according to claim 18, wherein the cyclonic guide comprises:
a sleeve, a part of the sleeve being fitted over the first section; and
a guide plate provided between the sleeve and the cyclone to define a spiral channel along with the sleeve and the cyclone, the spiral channel allowing the dirty air to spirally flow from the air inlet to the filter inlet.

* * * * *